United States Patent [19]

Robison et al.

[11] Patent Number: 4,965,626
[45] Date of Patent: Oct. 23, 1990

[54] PRINTING AND MAKEOVER PROCESS FOR MAGNETICALLY ENCODABLE FILM WITH DEDICATED MAGNETIC TRACKS

[75] Inventors: Gary L. Robison, Rochester; Michael L. Wash, Pittsford, both of N.Y.

[73] Assignee: Eastman Kodak Company, Rochester, N.Y.

[21] Appl. No.: 255,892

[22] Filed: Oct. 7, 1988

[51] Int. Cl.$^5$ .................. G03B 27/52; G03B 17/24
[52] U.S. Cl. ................................. 355/40; 354/106
[58] Field of Search ............... 354/21, 105, 106, 109, 354/75, 76; 355/40, 41, 42, 43; 352/92, 236

[56] References Cited

U.S. PATENT DOCUMENTS

| | | | |
|---|---|---|---|
| 2,937,914 | 5/1960 | Blake | 346/107 |
| 3,603,974 | 9/1971 | Copeland | 346/23 |
| 3,718,074 | 2/1973 | Davis | 95/1.1 |
| 3,736,849 | 6/1973 | Thompson | 95/1.1 |
| 3,797,025 | 3/1974 | Murphy, Jr. et al. | 354/77 |
| 3,807,851 | 4/1974 | Knox et al. | 353/120 |
| 3,810,218 | 5/1974 | Millett | 354/204 |
| 3,828,356 | 8/1974 | Wiers | 346/108 |
| 3,843,956 | 10/1974 | Kauneckas | 354/108 |
| 3,889,281 | 6/1975 | Taguchi et al. | 354/109 |
| 3,971,049 | 7/1976 | Ohmori et al. | 354/127 |
| 3,995,289 | 11/1976 | Shono | 354/109 |
| 4,001,846 | 1/1977 | Kauneckas | 354/105 |
| 4,025,931 | 5/1977 | Taguchi et al. | 354/105 |
| 4,042,298 | 8/1977 | Herrmann | 355/40 |
| 4,073,588 | 2/1978 | Zangenfeind et al. | 355/41 |
| 4,074,294 | 2/1978 | Fujita et al. | 354/106 |
| 4,079,388 | 3/1978 | Takahama et al. | 354/31 |
| 4,112,444 | 9/1978 | Yonemoto et al. | 354/106 |
| 4,117,502 | 9/1978 | Takeda et al. | 354/106 |
| 4,120,572 | 10/1978 | Grallert et al. | 352/92 |
| 4,150,882 | 4/1979 | Konick | 352/39 |
| 4,182,560 | 1/1980 | Oguchi et al. | 354/106 |
| 4,199,242 | 4/1980 | Hosomizu et al. | 354/145 |
| 4,211,558 | 7/1980 | Oguchi et al. | 430/359 |
| 4,215,920 | 8/1980 | Butler | 352/92 |
| 4,235,544 | 11/1980 | Yamada et al. | 354/106 |
| 4,270,853 | 6/1981 | Hatada et al. | 354/76 |
| 4,270,854 | 6/1981 | Stemme et al. | 354/76 |
| 4,327,979 | 5/1982 | Tominaga et al. | 354/105 |
| 4,340,286 | 7/1982 | Carr | 354/105 |
| 4,344,683 | 8/1982 | Stemme | 354/106 |

(List continued on next page.)

FOREIGN PATENT DOCUMENTS

| | | |
|---|---|---|
| 246799A | 11/1987 | European Pat. Off. |
| 0293887 | 6/1988 | European Pat. Off. |
| 2159466 | 6/1973 | Fed. Rep. of Germany |
| 2746036 | 10/1977 | Fed. Rep. of Germany |
| 225088A3 | 10/1973 | German Democratic Rep. |
| 53-106115 | 2/1977 | Japan |
| 5695232 | 12/1979 | Japan |
| 58-128893 | 1/1982 | Japan |
| 59104635 | 12/1982 | Japan |
| 59-201055 | 4/1983 | Japan |
| 6014239 | 7/1983 | Japan |

(List continued on next page.)

OTHER PUBLICATIONS

*Research Disclosure,* 1984, H. J. Krall, "Magnetically Positioned Photographic Film".
Eastman Kodak Company, *Data Code Magnetic Control Surface,* 1983.

Primary Examiner—A. A. Mathews
Attorney, Agent, or Firm—Francis H. Boos, Jr.

[57] ABSTRACT

A virtually transparent magnetic layer is included as an additional layer in a color negative film. Information exchange between various users of the film—such as the camera user, the dealer and photofinisher—is carried via plural longitudinal magnetic tracks on the film, each track being dedicated to the writing and reading of a predetermined set of related parameters. The printing and makeover process of the invention responds to data on the dedicated magnetic tracks on the film to govern the process and uses these tracks as a memory to write and retrieve data governing later steps in the process. The contents of a makeover/reorder instruction track on an initial frame of the film is determined and used, in conjunction with classification and makeover correction data contained in subsequent film tracks, in the printing and makeover process.

3 Claims, 25 Drawing Sheets

U.S. PATENT DOCUMENTS

| | | | |
|---|---|---|---|
| 4,349,272 | 9/1982 | Holthusen | 355/69 |
| 4,361,388 | 11/1982 | Mlcak et al. | 354/106 |
| 4,362,369 | 12/1982 | Kazami et al. | 354/106 |
| 4,365,882 | 12/1982 | Disbrow | 354/106 |
| 4,368,967 | 1/1983 | Imura | 354/106 |
| 4,384,771 | 5/1983 | Sakurada et al. | 354/105 |
| 4,400,457 | 8/1983 | Johnson | 430/140 |
| 4,422,752 | 12/1983 | Thurm et al. | 355/41 |
| 4,437,742 | 3/1984 | Taniguchi | 354/21 |
| 4,443,077 | 4/1984 | Tanikawa | 354/21 |
| 4,493,547 | 1/1985 | Bridges | 354/424 |
| 4,497,552 | 2/1985 | Howard et al. | 354/106 |
| 4,500,183 | 2/1985 | Tanikawa | 354/21 |
| 4,511,229 | 4/1985 | Schwartz et al. | 354/20 |
| 4,515,452 | 5/1985 | Tsuzuki | 354/106 |
| 4,544,259 | 10/1985 | Kanaoka et al. | 355/1 |
| 4,548,492 | 10/1985 | Kanaoka et al. | 355/50 |
| 4,553,833 | 11/1985 | Kanaoka et al. | 355/40 |
| 4,554,591 | 12/1985 | Kee | 358/256 |
| 4,574,319 | 3/1986 | Konishi | 358/335 |
| 4,577,961 | 3/1986 | Terashita | 355/77 |
| 4,583,831 | 4/1986 | Harvey | 354/106 |
| 4,613,911 | 9/1986 | Ohta | 360/3 |
| 4,659,198 | 4/1987 | Beauviala et al. | 352/92 |
| 4,659,213 | 4/1987 | Matsumoto | 355/38 |
| 4,684,229 | 8/1987 | Utsugi | 354/106 |
| 4,689,696 | 8/1987 | Plummer | 358/333 |
| 4,702,580 | 10/1987 | Denner | 354/106 |
| 4,705,372 | 11/1987 | Lapeyre | 354/106 |
| 4,728,978 | 3/1988 | Inoue et al. | 354/289 |
| 4,736,215 | 4/1988 | Hudspeth et al. | 354/21 |
| 4,774,534 | 9/1988 | Kazumi et al. | 354/21 |
| 4,779,145 | 10/1988 | Lemelson | 360/2 |
| 4,797,713 | 1/1989 | Terashita et al. | 355/77 |
| 4,811,042 | 3/1989 | Cloutier et al. | 354/106 X |

FOREIGN PATENT DOCUMENTS

| | | |
|---|---|---|
| 59-162549 | 8/1983 | Japan . |
| 6053952 | 9/1983 | Japan . |
| 60-185940 | 9/1985 | Japan . |
| 60-185941 | 9/1985 | Japan . |
| 61-246730 | 11/1986 | Japan . |
| 63165835 | 12/1986 | Japan . |
| 63165836 | 12/1986 | Japan . |
| 62-112141 | 5/1987 | Japan . |
| 62-112142 | 5/1987 | Japan . |
| 2083652 | 9/1980 | United Kingdom . |
| 2083441B | 7/1984 | United Kingdom . |
| 2158955A | 11/1985 | United Kingdom . |

| TRACK | FRAME 0, 26 | FRAME 1-25 |
|---|---|---|
| Gen'l | FILM TYPE IDENT | |
| C0 | ID's<br>-OWNER (20)<br>-CAMERA (15)<br>-CAMERA DEALER (20)<br>-DIRECTORY OF WRITTEN INFORMATION | CAMERA PRIMARY<br>-DATE<br>-TIME (ACTUAL, ELAPSED)<br>-ORIENTATION REVERSE WIND VS. FORWARD WIND CAMERA<br>-LUMINANCE LEVEL<br>-FLASH FIRE<br>-SERIES SCENE<br>-CAMERA ROLL #<br>-CAMERA EXPOSURE #<br>-FRAME # |
| C1 | | CAMERA SECONDARY<br>-EOS FEATURES |
| C2 | | USER INPUT |
| F0 | ID's<br>-OWNER (60)<br>-P/F DEALER ID (20)<br>-LAB (20)<br>-USER INPUT FEATURE IND.<br>-END OF ORDER FLAG | USER INPUT |
| F1 | INITIAL ORDER INFO<br>-ORDER REQUEST<br>-ROLL ID<br>-FILM TYPE<br>-COMPLETED ORDER INFO<br>-CLASSIFICATION FLAG | PROCESS INFORMATION<br>-CLASSIFICATION<br>-INSPECTION INFORMATION<br>-MAKEOVER CORRECTION<br>-PRINTS MADE |
| F2 | REORDER/MAKEOVER INFO<br>-ORDER REQUEST<br>-ORDER TYPE (REO/MO)<br>-COMPLETED ORDER INFO | PROCESS INFORMATION<br>-PRINTS MADE |
| F3 | FILM-TO-VIDEO TRACK | |
| F4 | ELECTRONIC PRINT PROCESSING TRACK | |
| F5-F14 | RESERVED FOR AUDIO | |

FIG. 5

PRE-RECORDED BY CAMERA (ON FILM)

| | |
|---|---|
| -CAMERA OWNER IDENTIFICATION | AA |
| -CAMERA IDENTIFICATION NO. | AB |
| -ISO USED BY CAMERA | AC |
| -DEALER ID | AD |
| -REVERSE WIND | AE |
| -SPECIAL USE INSTRUCTIONS, MRO, ETC. | AF |

RECORDED BY CAMERA AT EACH FRAME (ON FILM)

| | |
|---|---|
| -METERING FIDUCIAL | BA |
| -DATE OF EXPOSURE | BB |
| -TIME OF EXPOSURE | BC |
| -CAMERA ORIENTATION | CA |
| -f NUMBER | CB |
| -SHUTTER SPEED | CC |
| -FOCAL LENGTH | CD |
| -FLASH FIRE | CE |
| -FLASH RETURN | CF |
| -FILL FLASH RATIO | CG |
| -BACKLIT SCENE INDICATOR | CH |
| -EXPOSURE BIAS | CI |
| -SERIES SCENE | CJ |
| -ILLUMINANT COLOR TEMPERATURE | CK |
| -LUMINANCE RANGE | CL |
| -LUMINANCE LEVEL | CM |
| -SUBJECT DISTANCE | CN |
| -BEYOND CAMERA EXPOSURE RANGE | CO |
| -BEYOND MINIMUM SHUTTER RANGE | CP |
| -PSEUDO FORMAT-(TELE/PAN) | DA |
| -SCENE CLASSIFICATION | DB |
| -REVERSE WIND CAMERA | DC |
| -TEMPERATURE | DD |
| -USER INPUT | EA |
| -IDENTIFY PRINCIPAL SUBJECT | EB |
| -SUBJECT MOTION | EC |
| -CAMERA MOTION | ED |
| -STANDARD EXPOSURE | EE |
| -CAMERA FRAME NUMBER | FA |
| -CAMERA ROLL NUMBER | FB |
| -PUSH PROCESS | FC |
| -FRAME NUMBER | FD |
| -ELAPSED TIME | FE |

RECORDED AT RETAIL ORDER STATION

| | |
|---|---|
| -CUSTOMER IDENTIFICATION | GA |
| -ORDER ENTRY DATE/TIME | GB |
| -CUSTOMER CHARGE CARD NUMBER | GC |
| -RETAILER IDENTIFICATION | GD |
| -FRAME NUMBERS TO BE PRINTED | GE |
| -NUMBER PRINTS PER NEGATIVE | GF |
| -PRINT SIZE | GG |
| -MASK CHOICE | GH |
| -CROPPING INFORMATION | GI |
| -PAPER SURFACE FINISH | GJ |
| -ORDER RETURN DATE | GK |
| -METHOD OF RETURN | GL |
| -SPECIAL EFFECTS | GM |
| -SPECIAL SERVICES | GN |
| -PUSH PROCESS | GO |

RECORDED AT PHOTOFINISHER

| | |
|---|---|
| PF DEALER ID | HA |
| LAB ID | HB |
| END OF ORDER FLAG | HC |
| CLASSIFICATION FLAG | HD |
| CLASSIFICATION | HE |
| MAKEOVER FLAG | HF |
| MAKEOVER CORRECTION | HG |
| UNSALVAGEABLE FLAG | HH |
| NO. OF PRINTS MADE | HI |

| CHARACTER | 6-BIT BYTE | | | | | |
|---|---|---|---|---|---|---|
| 0 | 0 | 1 | 0 | 0 | 0 | 0 |
| 1 | 0 | 1 | 0 | 0 | 0 | 1 |
| 2 | 0 | 1 | 0 | 0 | 1 | 0 |
| 3 | 0 | 1 | 0 | 0 | 1 | 1 |
| 4 | 0 | 1 | 0 | 1 | 0 | 0 |
| 5 | 0 | 1 | 0 | 1 | 0 | 1 |
| 6 | 0 | 1 | 0 | 1 | 1 | 0 |
| 7 | 0 | 1 | 0 | 1 | 1 | 1 |
| 8 | 0 | 1 | 1 | 0 | 0 | 0 |
| 9 | 0 | 1 | 1 | 0 | 0 | 1 |
| A | 1 | 0 | 0 | 0 | 0 | 1 |
| B | 1 | 0 | 0 | 0 | 1 | 0 |
| C | 1 | 0 | 0 | 0 | 1 | 1 |
| D | 1 | 0 | 0 | 1 | 0 | 0 |
| E | 1 | 0 | 0 | 1 | 0 | 1 |
| F | 1 | 0 | 0 | 1 | 1 | 0 |
| G | 1 | 0 | 0 | 1 | 1 | 1 |
| H | 1 | 0 | 1 | 0 | 0 | 0 |
| I | 1 | 0 | 1 | 0 | 0 | 1 |
| J | 1 | 0 | 1 | 0 | 1 | 0 |
| K | 1 | 0 | 1 | 0 | 1 | 1 |
| L | 1 | 0 | 1 | 1 | 0 | 0 |
| M | 1 | 0 | 1 | 1 | 0 | 1 |
| N | 1 | 0 | 1 | 1 | 1 | 0 |
| O | 1 | 0 | 1 | 1 | 1 | 1 |
| P | 1 | 1 | 0 | 0 | 0 | 0 |
| Q | 1 | 1 | 0 | 0 | 0 | 1 |
| R | 1 | 1 | 0 | 0 | 1 | 0 |
| S | 1 | 1 | 0 | 0 | 1 | 1 |
| T | 1 | 1 | 0 | 1 | 0 | 0 |
| U | 1 | 1 | 0 | 1 | 0 | 1 |
| V | 1 | 1 | 0 | 1 | 1 | 0 |
| W | 1 | 1 | 0 | 1 | 1 | 1 |
| X | 1 | 1 | 1 | 0 | 0 | 0 |
| Y | 1 | 1 | 1 | 0 | 0 | 1 |
| Z | 1 | 1 | 1 | 0 | 1 | 0 |
| SPACE | 0 | 0 | 0 | 0 | 0 | 0 |
| = | 0 | 1 | 1 | 1 | 0 | 1 |
| $ | 0 | 0 | 0 | 1 | 0 | 0 |
| - | 0 | 0 | 1 | 1 | 0 | 1 |
| . | 0 | 0 | 1 | 1 | 1 | 0 |
| / | 0 | 0 | 1 | 1 | 1 | 1 |

FIG. 9

| Char | Bits | Description |
|---|---|---|
| : | 1 0 0 0 0 0 0 | FILM REVERSED START SENTINEL (FIRST CHARACTER) |
| ; | 0 1 0 0 0 0 0 | |
| * | 1 1 0 0 0 0 0 | END SENTINEL (FIRST CHARACTER) AND FILM-REVERSED VERSION OF SAME |
| # | 0 0 1 0 0 0 0 | |
| & | 1 0 1 0 0 0 0 | |
| . | 0 1 1 0 0 0 0 | |
| ( | 1 1 1 0 0 0 0 | ID SENTINEL (USED BY ALL EXCEPT MFG.) |
| ) | 0 0 0 1 0 0 0 | |
| * | 1 0 0 1 0 0 0 | |
| + | 0 1 0 1 0 0 0 | |
| , | 1 1 0 1 0 0 0 | |
| - | 0 0 1 1 0 0 0 | START SENTINEL (FIRST CHARACTER) |
| . | 1 0 1 1 0 0 0 | |
| / | 0 1 1 1 0 0 0 | |
| ? | 1 1 1 1 0 0 0 | FILM REVERSED 2ND CHARACTER OF START SENTINEL AND END SENTINEL |
| @ | 0 0 0 0 1 0 0 | |
| _ | 1 0 0 0 1 0 0 | ID SENTINEL (USED ONLY BY FILM MFG) |
| / | 0 1 0 0 1 0 0 | |
| — | 1 1 0 0 1 0 0 | |
| ' | 0 0 1 0 1 0 0 | |
| \| | 1 0 1 0 1 0 0 | START SENTINEL (2ND CHARACTER) AND END SENTINEL (2ND CHARACTER) |

FIG. 9

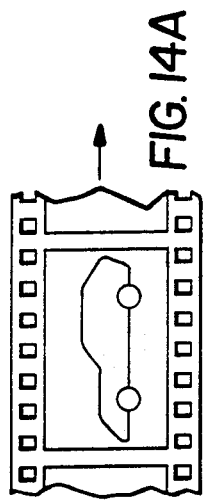
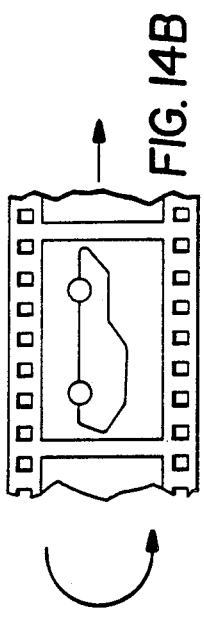
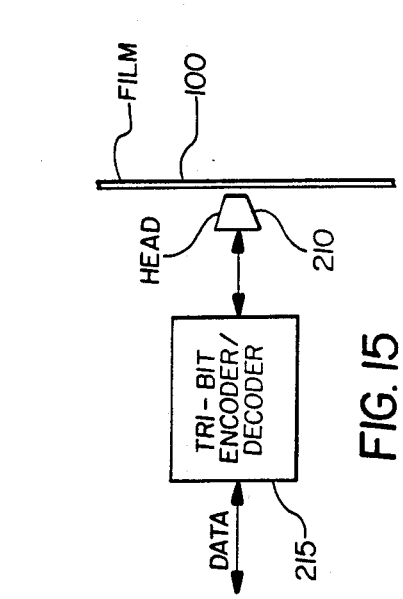
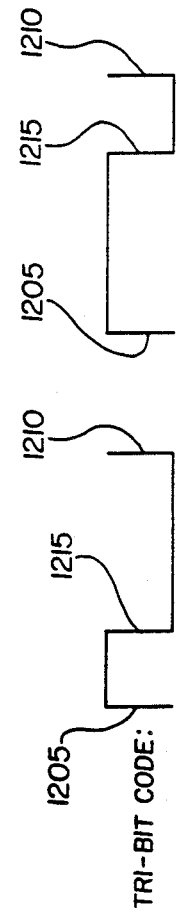
FIG. 14A
FIG. 14B
FIG. 15
FIG. 13
FIG. 12B
FIG. 12A

| SUB FIELD NO. | BYTE NO. | BIT NO. | | BIT MAP INSTRUCTION |
|---|---|---|---|---|
| 1 | 1 | | BIT 4, BIT 3, | DATA RECORDED IN BIT 3 EXPOSURE BEYOND RANGE |
| | | | BIT 2, BIT 1, | DATA RECORDED IN BIT 1 EXPOSURE HAS BEEN MADE |
| | | 1-6 = | 110000 | NO DATA |
| 3 | 3 | | BIT 4, BIT 3, BIT 2, BIT 1, | DATA RECORDED IN BIT 3 FLASH WAS FIRED DATA RECORDED IN BIT 1 FLASH RETURN SENSED OK |
| | | 1-6 = | 110000 | NO DATA |

FIG. 17a

| SUB FIELD NO. | BYTE NO. | VALUE | STATE IDENTIFIER INSTRUCTION |
|---|---|---|---|
| 2 | 2 | | |
| | | 100000 | NORMAL CAMERA ORIENTATION |
| | | 100001 | CAMERA IS "UPSIDE DOWN" |
| | | 100010 | RIGHT SIDE OF CAMERA IS UP |
| | | 100011 | LEFT SIDE OF CAMERA IS UP |
| | | 100111 | UNABLE TO DETERMINE ORIENTATION |
| | | 110000 | NO DATA |
| 4 | 4 | | |
| | | 100000 | NORMAL CONTRAST SCENE |
| | | 100001 | NORMAL SCENE, LOW CONTRAST |
| | | 100010 | NORMAL SCENE HIGH CONTRAST |
| | | 100011 | LIGHT COLORED SCENE, LOW CONTRAST |
| | | 100110 | LIGHT COLORED SCENE, HIGH CONTRAST |
| | | 100100 | DARK SCENE, HIGH CONTRAST |
| | | 100101 | DARK SCENE, LOW CONTRAST |
| | | 100111 | BACKLIGHTED SCENE |
| | | 110000 | NO DATA |
| 5 | 5 | | |
| | | 100000 | CAMERA METER NOT USED |
| | | 100001 | SCENE AVERAGE METERING |
| | | 100010 | CENTER WEIGHTED AVERAGE |
| | | 100011 | SPOT METERED |
| | | 100100 | MULTI-SPOT METERED |
| | | 110000 | NO DATA |
| 7 | 8 | | |
| | | 100001 | DAYLIGHT EXPOSURE |
| | | 100010 | TUNGSTEN EXPOSURE |
| | | 100011 | FLUORESCENT EXPOSURE |
| | | 110000 | NO DATA |

FIG. 17b

| SUB FIELD NO. | BYTE NO. | SCALING ALGORITHM INSTRUCTION |
|---|---|---|
| 6 | 6,7 | READ LAST 4 BITS OF BYTES 6 AND 7 →<br>    8-BIT INTEGER, I<br>    MULTIPLY I BY 100,<br>AND ADD 2000, TO CALCULATE<br>COLOR TEMPERATURE, DEGREES KELVIN.<br><br>110000 IN BYTE 7 = NO DATA IN BYTES 6, 7 |
| 8 | 9 | USE LAST 4 BITS TO CREATE AN INTEGER<br>2**INT = SCENE LUMINANCE RANGE<br><br>110000 = NO DATA |
| 9, | 10,11 | TAKE LAST 4 BITS OF BYTE 10 AND 11<br>COMBINE TO MAKE AN INTEGER<br>2**INT = AVERAGE SCENE LUMINANCE (ftL)<br><br>110000 = NO DATA |
| 10 | 12 | 2**INT = CAMERA SUBJECT DISTANCE<br><br>110000 = NO DATA |

FIG. 17c

PRINTING AND MAKEOVER PROCESS FOR MAGNETICALLY ENCODABLE FILM WITH DEDICATED MAGNETIC TRACKS

CROSS REFERENCE TO RELATED APPLICATIONS

This application discloses subject matter related to subject matter disclosed in U.S. patent application Ser. No. 255,693 filed herewith entitled "Film Information Exchange System Using Dedicated Magnetic Tracks on Film" by Robert P. Cloutier et al., U.S. patent application Ser. No. 255,798 filed herewith entitled "Frame-by-Frame Data Recording Film Information Exchange System Using Dedicated Magnetic Tracks on Film" by Robert P. Cloutier et al., abandoned, U.S. patent application Ser. No. 254,982 filed herewith entitled "Film Information Exchange System Using Dedicated Magnetic Tracks on Film with Virtual Data Identifiers" by Gary L. Robison, now patent number abandoned U.S. patent application Ser. No. 254,987 filed herewith entitled "Self-Clocking Encoding/Decoding Film Information Exchange System Using Dedicated Magnetic Tracks on Film" by Michael L. Wash et al., U.S. patent application Ser. No. 255,580 filed herewith entitled "Photofinishing Apparatus with Film Information Exchange System Using Dedicated Magnetic Tracks on Film" by Gary L. Robison et al., now abandoned, U.S. patent application Ser. No. 255,006 filed herewith entitled "Order Entry Process for Magnetically Encodable Film with Dedicated Magnetic Tracks" by Gary L. Robison et al., abandoned, U.S. patent application Ser. No. 255,891 filed herewith entitled "Finishing Process for Magnetically Encodable Film with Dedicated Magnetic Tracks" by Gary L. Robison et al., abandoned. U.S. patent application Ser. No. 255,578 filed herewith entitled "Data Alignment Circuit And Method For Self-Clocking Encoded Data" by Michael L. Wash: U.S. patent application Ser. No. 255,002 filed herewith entitled "Film-T-Video Player Using Dedicated Magnetic Tracks On Film" by Michael L. Wash; U.S. patent application Ser. No. 254,998 filed herewith entitled "Photofinishing Process With Film-To-Video Printer Using Dedicated Magnetic Tracks On Film" by Michael L. Wash: U.S. Patent application Ser. No. 255,672 filed herewith entitled "Implicit Mid Roll Interrupt Protectin Code For Camera Using Dedicated Magnetic Tracks On Film; all assigned to the assignee of the present application.

BACKGROUND OF THE INVENTION

Limitations of Current Consumer Photography Technology

Communication between the camera user and the dealer or photofinisher typically requires written forms which are filled out by the user, usually well after a given scene has been photographed. Thus, in addition to the inconvenience of filling out such a form, scene-related information is typically lost or forgotten. Such information may include the user's desire to not have a particular frame printed or to have several prints made from a given frame, for example. Such information may also include the photographic parameters of the scene, observed by the user or by a sensor, which would have aided the photofinisher's classification of the scene to increase the quality of the prints made from the film.

Several factors reduce the efficiency of the overall photofinishing process. For example, in a large photofinishing laboratory not operating on a 24 hour per day basis, the film processing equipment must lie dormant for a period of time at the beginning of each work day until enough incoming customer film has been sorted to form one batch of a minimum number (e.g. 70) of film strips of the same type (such as color negative 35 mm film) to justify running the printing equipment. Of course, undeveloped film (regular customer orders) must be separated from developed film (print re-orders).

More significant sources of inefficiency in the photofinishing process include the mechanical steps required to maintain proper correspondence between each film strip and the prints made from it, as well as the customer's identity. These mechanical steps include the sorting and handling of each form or envelope originally filled out by the customer so that the envelope follows the customer's film strip throughout the photofinishing process and winds up with the corresponding set of prints.

One of the most significant sources of inefficiency in the photofinishing process arises from the necessity of re-printing an image from a particular frame on a customer's film strip whenever inspection reveals that the corresponding original print was incorrectly made (usually by an incorrect exposure of the photosensitive print paper to the developed film negative image). In order to replace the original print with a better (so-called "makeover") print, the exposure conditions ("classification") used to make the original print from the negative film image must first be corrected. The particular film negative frame in question must be reclassified and then reprinted while preserving the original prints of the other frames. This typically requires notching the prints to indicate the boundaries between adjacent prints and between adjacent orders on a roll of prints as well as marking any original print requiring a makeover in a labor intensive procedure which ensures that proper correspondence between each film strip and the corresponding original prints, makeover prints and customer order form (envelope) is never lost.

Problems to be Solved by the Invention

Recording of information on the film has been loosely suggested as one possible way around some of the limitations described above. These suggestions have ranged from optical recording of eye-readable symbols or machine readable symbols to the magnetic recording of machine readable data. Of course, optical recording on the film has only limited use, because once the film has been developed, no further recording may be done. Furthermore, the information must be restricted to those limited areas on the film not occupied by the camera-exposed image of each frame, a significant limitation on the amount of information that can be recorded.

With magnetic recording in a virtually transparent magnetic layer, high density recording may be done everywhere on the film including in the image area, so that all relevant information theoretically could be recorded with each frame on the film. However, what has not been recognized in the prior art is that complete exploitation of the potential capabilities of magnetic recording on film results in an unwieldy mass of data being recorded on the film, various bits of which must be separately accessed at various stages of the film use by camera and photofinisher. In such a scenario, the photofinisher in particular must find a certain needle of data in a massive haystack of data at a given step in the photofinishing process.

Thus, a specific problem is how to enable the photofinisher (or any other later user of the film) to quickly find a particular desired piece of data at a particular point in time during film processing without searching through or reading other data to find the one desired piece. A related problem is how to identify each individual parameter or piece of data without imposing a large data overhead with one-for-one identification codes. Yet another problem is how to minimize the number of bits required to uniquely represent all possible states of a given multi-state photographic parameter in data magnetically recorded on the film.

Another problem arises if the accommodation of magnetic reading/writing on the film by both the camera and the various dealer and photofinishing stages precludes the photofinisher from reading/writing on film formats adapted to ordinary cameras not having magnetic read/write capability. The problem here is how to permit the photofinisher to use magnetic recording on film without regard to the format of the film or the type of camera used, using the same magnetic recording format and hardware for all cases. Solving this last problem would permit all film for all cameras to include the additional magnetic layer, for photofinishing with the same magnetic read/write format and automated protocols using the film magnetic layer as a frame-by-frame scratch pad memory.

SUMMARY OF THE INVENTION

Magnetic reading and writing of information in a virtually transparent magnetic layer in the film during each stage of film use and film processing is restricted to certain dedicated parallel tracks extending longitudinally along the length of the film, the choice of track being determined in accordance with the particular information being recorded. Each track begins and ends essentially within a particular frame. Magnetic reading/writing is performed with transport of the film by the camera during field use and during transport of the film by the dealer or photofinisher during film processing, printing, etc.

The tracks are dedicated by universal pre-arrangement to certain sets of parameters or information, each set being of particular interest to a certain stage in the use of the film, the various stages including the camera, the dealer order entry station, the photofinisher order entry station, the classifier, the printer, the inspection or re-classifier station and the enveloper-sorter station.

The photofinisher tracks occupy the principal image area of each frame, so as to maximize the number of tracks available to the photofinisher and to render the format of these tracks virtually immune to any differences between various film formats or film perforation patterns. The photofinisher tracks therfore have a universally applicable format useful for additional applications such as a film-to-video player and the like.

The camera tracks are present only in film adapted for use in cameras having magnetic read/write capability. For this purpose, the camera tracks are accommodated along the film edges, without impacting the photofinisher track locations, by interruption of the usual film perforation pattern along the film edges. In the preferred embodiment, each perforation is located next to the image area, while the camera tracks are located within the image area of each frame along the film edges between successive perforations.

Each block of data is appended to a virtual identification code whose meaning is defined in a look-up table accessable to the system. Instructions contained in the look-up table for a given virtual identification code provide the byte location of and encoding (recording) or decoding (playback) algorithm for several related parameters recorded within the data block bearing that identification code. Any one of three types of virtual identification codes are employed, depending upon the type of related data recorded in the block: (a) Bit map identification codes point to bit mapping instructions in the look-up table, in which the state of certain individual bits in the block reflect the state of parameters having two possible states (e.g. flash was fired, or exposure was made, etc.). (b) State identifier codes point to state identification instructions stored in the look-up table in which various patterns of certain bytes in the block reflect the state of parameters having several possible states. (c) Scaling identification codes point to individual scaling instructions stored in the look-up table for certain bytes in the block.

In a preferred embodiment of the invention, the various types of information are allocated among the dedicated tracks in accordance with groups of related information types or parameters, some individual groups being used by more than one stage of the film use cycle. Furthermore, in this preferred embodiment, information common to all frames of the film is in dedicated tracks on the film leader. Specifically, information such as film type, camera type, owner identification, a directory of written, information and the like are recorded in a first camera track (near one film edge) on the film leader. This first camera track is designated track C0 while the film leader is designated frame 0. Scene related parameters automatically sensed by the camera (such as scene luminance, camera orientation, color temperature, flash fire, etc.) are recorded in track C0 in each subsequent frame (e.g. frames 1–25). A second camera track, track C1, is dedicated to the recording of secondary information, such as shutter speed, aperture size, etc. Clearly, an intelligent photofinishing classifier station, in attempting to compute the optimum exposure conditions to make a print, would read the data on track C0 in each of frames 1 through 25 (for example), while a photofinisher sorter machine, in attempting to maintain correspondence between a customer's film and his order form or envelope, would read the data on track C0 in frame 0. A similar sort of allocation of photofinisher dedicated tracks is employed, with customer print order request data being recorded in a first photofinisher track (F0) in frame 0, process data such as image classification and number of prints made being recorded by frame in track F01 and any makeover corrections in track F02. A summary of makeover data (e.g. total number of makeover prints) is recorded in track F02 of frame 0. Other photofinisher tracks may be dedicated to uses other than photofinishing, such as frame-by-frame user instructions for film-to-video players or electronic print processors.

SOLUTION TO THE PROBLEMS

The invention solves the problem of attaining data synchronization at all stages of film use without requiring that each stage transport the film at constant velocity nor even at the same velocity while recording or playing back data. The invention achieves this without requiring the recording of an extra space-wasting clocking track simultaneously with the data track. Instead, the representation of the binary state of a particular bit is unaffected by the film transport speed during recording and playback and is self-clocking. This representation uniquely depends upon the temporal relationship between each data transition pulse and its immediately preceeding and succeeding clock pulses in the serial pulse train comprising the self-clocking code. In the preferred embodiment, a one bit is represented by a data transition pulse which is closer to the preceeding clock pulse. For a zero bit, the data transition pulse is closer to the succeeding clock pulse.

The invention solves the data access problem faced by (among others) the photofinisher of "finding a needle in a haystack" because each stage need merely know which track has been dedicated to the data relevant to that stage, and may read the data from that track while ignoring all other data magnetically recorded on the film. Furthermore, in some cases the reading of data can be dispensed with entirely in order to make certain basic determinations about the film, by simply determining whether certain tracks are empty or not. For example, whether a particular strip of film has already been developed (and therefore was submitted for print reorder) is readily determined by seeing whether or not certain tracks (e.g. track F1 of frames 1–25) contain recorded data or not.

The invention solves the problem of making the photofinisher track format and the photofinisher magnetic read/write system universally applicable to all film formats, while maximizing the number of non-camera tracks, by placing the camera tracks at the film edges between perforations on special film having one perforation per frame.

DESCRIPTION OF THE DRAWINGS

The invention may be understood by reference to the accompanying drawings, of which:

FIG. 5 is a block diagram illustrating the architecture of a read only memory containing a directory of track locations for various parameters which may be magnetically written or read on the film, in accordance with the dedicated track format of FIG. 1;

FIG. 7 illustrates an exemplary data identification code table for universal use with the data format of FIG. 6 by all stages of film use including camera and photofinisher;

FIG. 8 illustrates an exemplary symbol table for universal use with the data format of FIG. 6 by all stages of film use including camera and photofinisher;

FIG. 9 illustrates an exemplary reserved control symbol table for universal use with the data format of FIG. 6 by all stages of film use including camera and photofinisher;

FIGS. 12a and 12b illustrate the form of the self-clocking code used in the invention;

FIG. 13 illustrates the use of each start and stop sentinel character and its compliment to facilitate film reversal sensing;

FIGS. 14a and 14b illustrate the type of film reversal which is best detected using the invention;

FIG. 15 illustrates a system for self-clocking recording of data on film;

FIGS. 17a, b and c illustrate look-up tables for three types of virtual identification codes;

DETAILED DESCRIPTION OF THE INVENTION

Preferred Format of the Dedicated Tracks on Film

Figure 1:
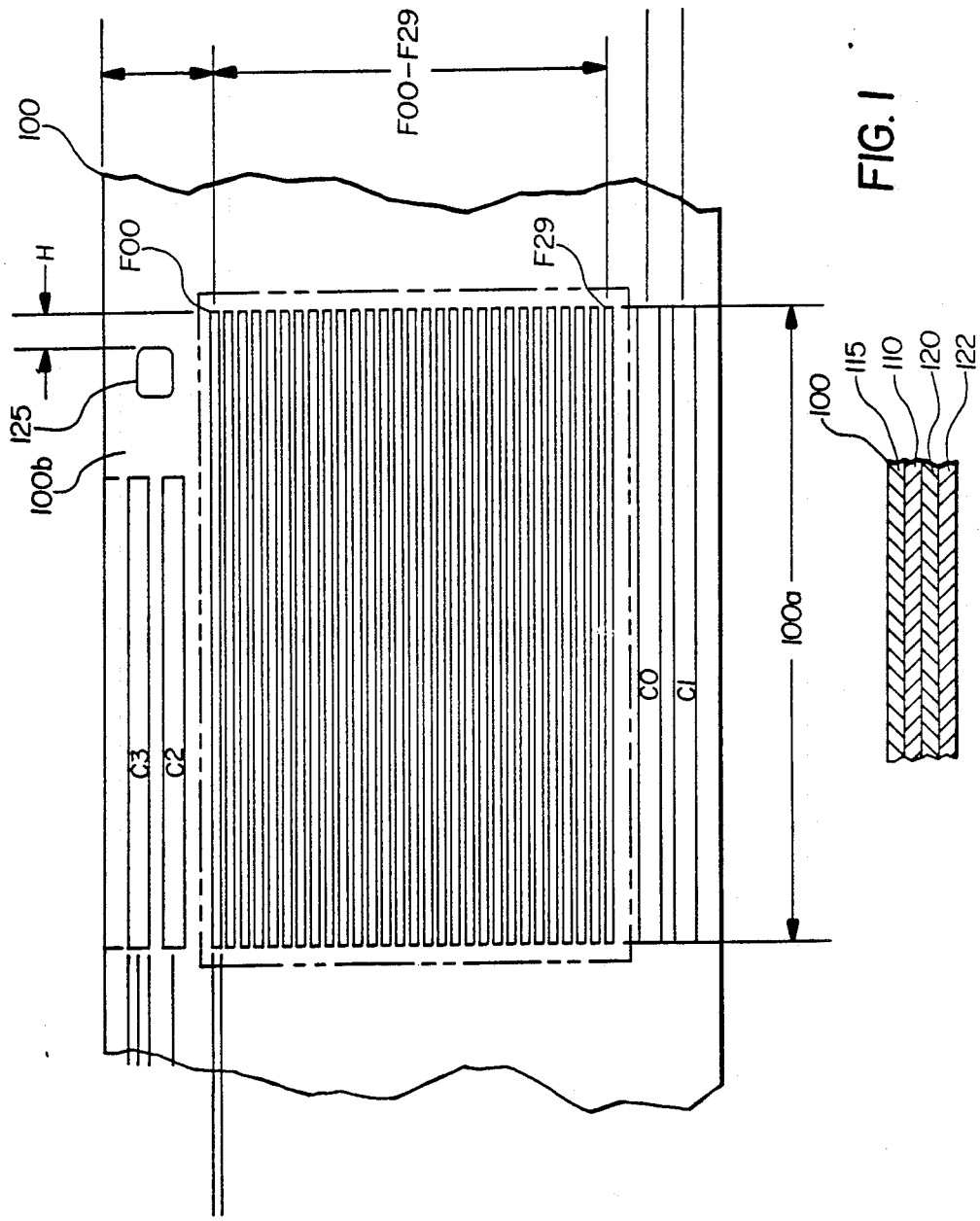
FIG. 1 is a diagram illustrating the parallel dedicated tracks in a virtually transparent magnetic layer on film having a special perforation format particularly adapted for use in cameras having a magnetic film read/write capability.

Referring to FIG. 1, a strip 100 of color negative film 35 millimeters wide includes a base 110, various well-known photo-chemical layers 115 on one side of the base 110 and a virtually transparent magnetic layer 120 on the other side. An anti-static and lubricating layer 122 overlies the magnetic layer 120. The film strip 100 includes perforations 125 spaced along the film edge at regular intervals matching the pitch of a metering pawl in a camera adapted to use the film strip 100.

For purposes of recording data in the magnetic layer 120, each frame of the film strip 100 is divided into a plurality of predetermined parallel longitudinal track locations where magnetic tracks of data may be recorded. Each of the tracks is preferably labeled as shown in FIG. 1. In particular, the two outermost tracks along each edge of the film strip 100 are tracks C0, C1 and tracks C2, C3, respectively. The thirty innermost tracks are tracks F00 through F29. Each one of the outermost tracks C0 through C3 is dedicated to the recording of a particular type of information by a camera having magnetic recording capability, in accordance with a pre-arrangement universally established for all cameras and photofinishers. In a similar manner, each one of the innermost tracks is dedicated to the recording of a particular type of information by a particular type of photofinishing (or other) equipment, in accordance with the above-referenced universal pre-arrangement.

In order to accommodate the presence of the camera tracks C0 through C3 along the film strip edges, the perforations 125 are excluded from an imperforate region 100a adjacent the exposed area of each frame on the film strip 100, and are restricted to intermediate regions 100b next to each frame. In the embodiment of FIG. 1, each intermediate region 100b has only one perforation. In the preferred embodiment, perforations lie along only one longitudinal edge of the film strip 100.

Use of Dedicated Film Tracks in a Camera

Figure 2:
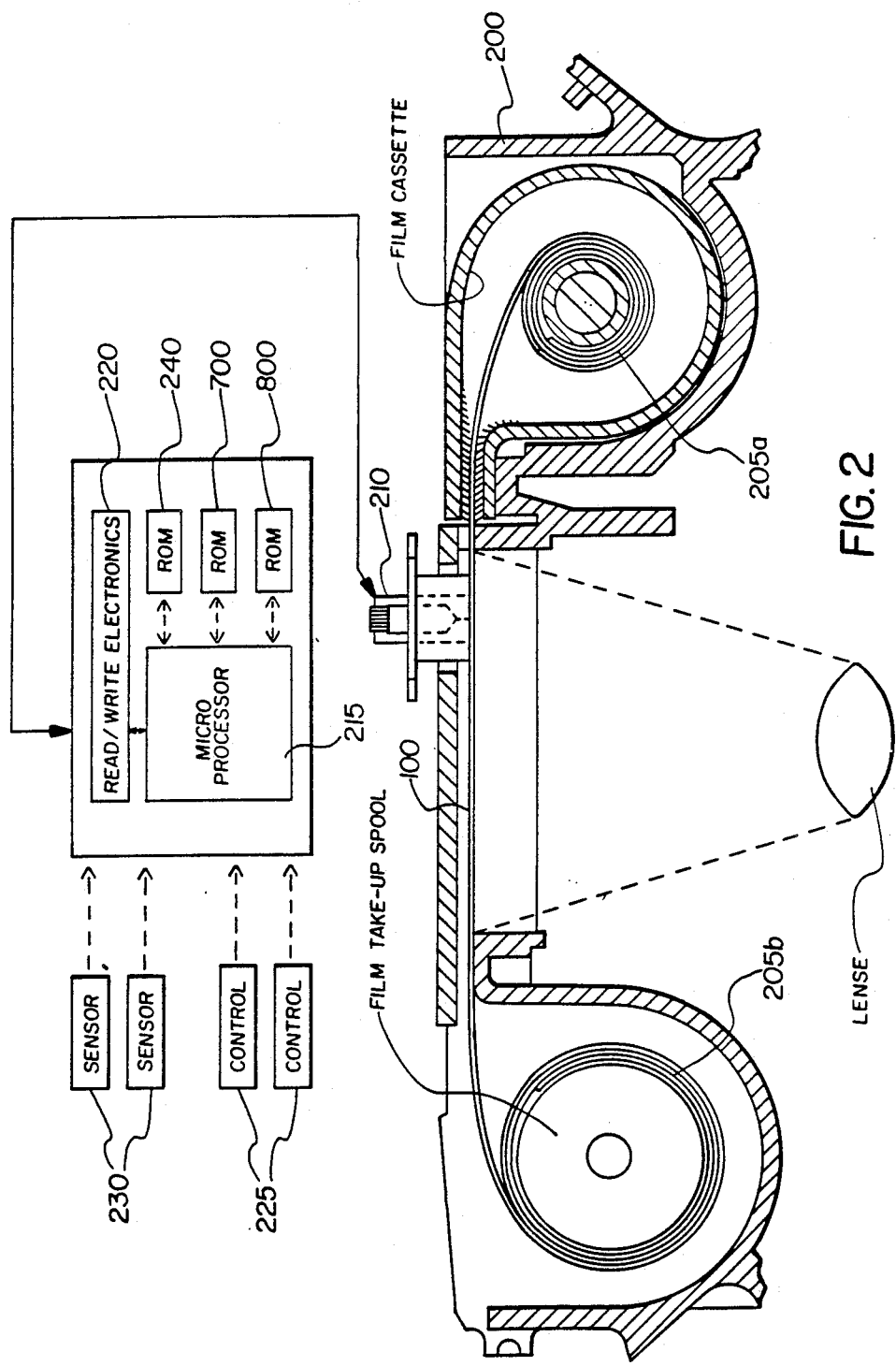
FIG. 2 is a simplified diagram illustrating the concept of a camera adapted to read or write data on the film of FIG. 1.

Referring to FIG. 2, a camera 200 transports the film strip 100 between the reels 205a,b, of a film cartridge and a take-up sprocket, respectively, conforming to the format of the perforations 125 of FIG. 1. The camera 200 includes a magnetic read/write head 210 in near proximity with the magnetic layer 120 on the unsensitized side of the film strip 100. A microprocessor 215 controls magnetic data recording or playback by the head 210 through head electronics 220.

The microprocessor 215 may accept order information to be magnetically recorded on the film strip 100 from the camera user through camera controls 225, such information pertaining to the number of prints desired for a given frame, by frame number, for example, or the name and address of the camera user for ultimate use by the photofinisher. The microprocessor 215 may also accept scene related information from scene sensors 230 to be magnetically recorded on the film strip 100 for ultimate use by the photofinisher. Such information may include camera orientation, scene luminance and the like.

Film-Velocity Independent Data Code

Using the dedicated track on film format of FIG. 1, data is recorded by either a camera, an order entry station, the photofinisher or any other stage of film use, by converting the data into binary bits and then encoding the binary data using a unique self-clocking code. Such self-clocking encoding is performed in accordance with the teachings of Michael Wash U.S. patent application Ser. No. 206,646 filed June 14, 1988 entitled "Method for Modulating a Binary Data Stream " and assigned to the assignee of the present application, abandoned, the disclosure of which is incorporated herein by reference.

The self-clocking code described in the referenced patent application is briefly summarized here with reference to FIG. 12 of the accompanying drawings. The code comprises a serial stream of pulse edge transitions of a first type (e.g. positive-going edge transitions) and those of a second type (e.g. negative-going edge transitions) in alternating sequence. The first type pulse transitions serve as clock indicators while the second type serve as binary data indicators. A binary one is indicated in FIG. 12a by a second type pulse transition 1215 which is temporally closer to the immediately preceeding first type pulse transition 1205 and farther from the succeeding first type pulse transition 1210. A binary zero is indicated in FIG. 12b by a second type pulse transition 1215' temporally closer to the succeeding first type pulse transition 1210 than to the preceeding one. With this novel self-clocking code, film transport velocity can vary during recording and playback without affecting the ability to synchronize and read the recorded data. Thus, the camera of FIG. 2 may record data while winding the film between exposures without imposing any velocity controls or recording an independent clock track.

The self-clocking code of FIG. 12 facilitates the automatic detection of film reversal. For this purpose, two six-bit characters from the table of reserved characters of FIG. 9 are chosen as the start and stop sentinels, respectively, recorded at the beginning and end of each frame in each dedicated track, in a manner described herein with reference to FIG. 6. Furthermore, the compliments of the two symbols thus chosen are also reserved, as indicated in FIG. 13, the latter two reserved symbols comprising a film-reversed start sentinel and a film-reversed stop sentinel. This arrangement exploits a property of the self-clocking code of FIG. 12 in which self-clocking data played back backwards (by transporting the film past the head in the direction opposite from that in which it was transported earlier during recording) results in its complement being decoded.

Thus, if the film image of FIG. 14a corresponds to the orientation of the film during the magnetic recording of data on the film by the camera for example, and if FIG. 14b corresponds to the orientation of the film as it is spliced and loaded into photofinishing equipment having magnetic read/write capability, the film reversed stop sentinel will be detected, followed by the film reversed start sentinel, with every frame of data. Such film-reversed start and stop sentinels serve as flags to notify the photofinisher than the film has been rotated as indicated in FIG. 14b. If the film as been turned inside out instead, the technique of FIG. 13 does not create a flag. However, such an error is easily detected, since it causes the opposite side of the film to face the photofinisher's magnetic heads, thus increasing the distance between the heads and the magnetic layer 120 of FIG. 1, resulting in a decrease in signal-to-noise ratio.

FIG. 15 illustrates a simple example of a magnetics on film self-clocking read/write system useful in the camera 200 of FIG. 2.

The advantage of the longitudinal dedicated track format of FIG. 1 is that magnetic recording of data on the film strip 100 may be performed by the camera using a relatively stationary head (i.e. the head 210) by buffering all of the data to be recorded in a particular frame in a particular camera track and then transmitting the data to the head just as the film is being wound to the next frame.

The microprocessor 215 includes a read only memory 240 containing instructions sufficient to ensure that each type of information received is recorded in the correct one of the dedicated camera tracks C0–C3 in accordance with a universal pre-arrangement common to both the camera and the photofinisher. For this purpose, the microprocessor sorts and buffers each piece of information in compliance with the instructions stored in the read only memory 240. The nature of this prearrangement and the architecture of the read only memory will be described below in this specification.

Dedicated Tracks Format for Ordinary Cameras and Film

Figure 3:
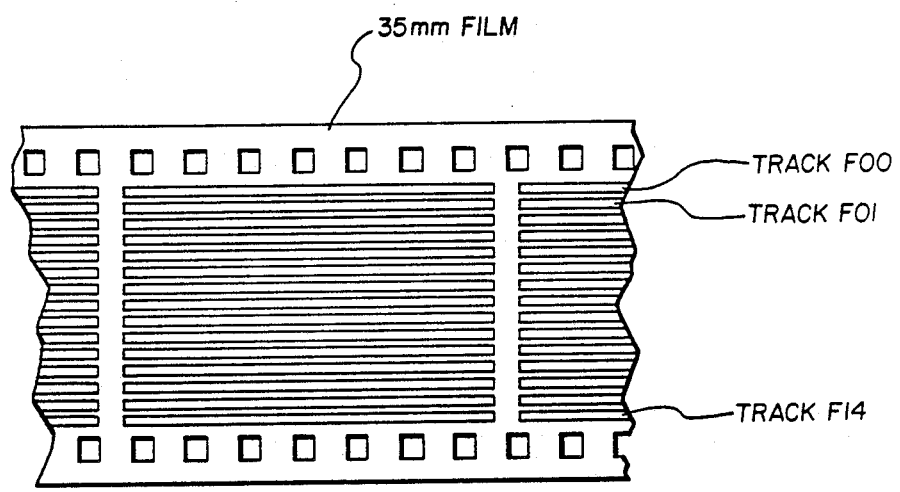
FIG. 3 is a diagram illustrating the parallel dedicated tracks in a virtually transparent magnetic layer on film having the currently ubiquitous perforation format used in ordinary cameras not having a magnetic film read/write capability.

The format of the photofinisher tracks F00 through F29 is the same regardless of the placement of the film perforations 125 of FIG. 1. Thus, a photofinisher may employ the same magnetic recording protocols and hardware on all types of film provided a virtually transparent magnetic layer (such as the layer 120 of FIG. 1) is added to all types of film. Thus, referring to FIG. 3, ordinary 35 mm color negative film having the now-standard pattern of closely spaced perforations along both film edges accommodates the photofinisher tracks F00 through F14 having the same width and spacing as that of the special film format of FIG. 1. Although the perforations of FIG. 3 preclude the presence of the camera tracks C0 through C3, such film is not used in cameras having magnetic read/write capabilities and so the camera tracks need not be present. The advantage here is that all subsequent users of the film (i.e. photofinisher, film-to-video player, etc.) have been allocated the maximum number of tracks for all film formats, including those of FIG. 1 and of FIG. 3.

Camera and Photofinisher Dedicated Track Widths

Figure 4:
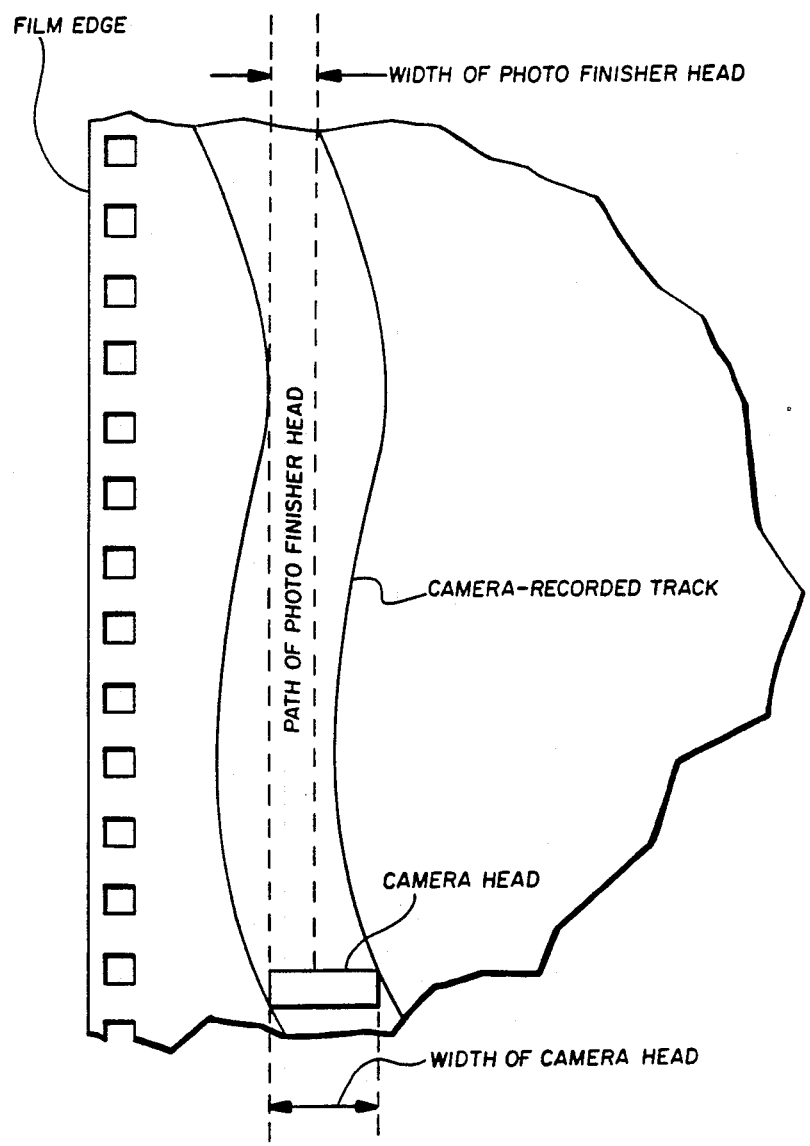
FIG. 4 is a diagram illustrating the accommodation of film wander in the camera of FIG. 2 by the use of different head widths at the various stages of film use.

Referring to FIG. 4, the width of the camera dedicated tracks C0–C3 is greater than that of the photofinisher tracks F00–F29. Of course, these track widths are controlled by the selection of the camera head widths and the photofinisher head widths. Preferably, the difference is sufficient to accommodate film wander in the camera during winding of the film while recording is performed by the head 210. Such wandering causes the camera tracks to have the meandering appearance illustrated in FIG. 4. Note in FIG. 4 that the photofinisher head, which must read the camera tracks, does not leave the camera track because it has a much smaller width.

Allocation of the Dedicated Tracks

FIG. 5 illustrates the allocation of the dedicated tracks, among the various information types, implemented by microcodes stored in the read only memory 240 of FIG. 2. There are four camera tracks and fifteen photofinisher tracks in each frame of the film exposed by the camera, these frames being designated frames 1 through 25. The film leader and trailer are designated frames 0 and 26, respectively. In general, the information recorded in frames 0 and 26 pertains to the film strip 100 as a whole, while the information recorded in each of frames 1 through 25 is unique for a particular frame. In FIG. 5, three of the four camera tracks are used by the camera, while three of the thirty photofinisher tracks are used by the photofinisher. The rest of the photofinisher tracks are reserved for the recording of film-to-video player instructions (track F03), electronic print processing instructions (track F04) and audio (track F05 through F14). The remaining tracks (F15–F29) are reserved for unforeseen purposes.

Each of the tracks is dedicated to a particular group of information types which would in most cases be written or read together. Thus, frame 0 track C0 is reserved for information relating to the owner and the camera for recording by the camera. Similarly, frame 0 track F00 is reserved for information relating to the owner and the photofinisher for recording by the photofinisher. Likewise, track F00 of frame 0 is reserved for recording by the photofinisher—or by an order entry station—of the customer's instructions, the film type, and related information pertaining to the treatment of the order. Track F02 of frame 0 is reserved for the recording of historical information regarding the location of frames requiring makeover prints and print reorders by the customer, for use by the photofinisher during a subsequent print reorder by the customer.

Track C0 of each exposed frame (frames 1–25) is reserved for scene-related information for recording by the camera, such as scene luminance, camera orientation and the like. Similarly, track F01 is reserved for photofinisher information unique to a particular exposed frame such as the classification of the negative image (determination of the proper print exposure), number of prints made, etc. Any makeover correction is put in track F02.

The embodiment of FIG. 5 does not take into account all of the information types which may be magnetically recorded by the camera, retail order station or photofinisher on the film. However, the embodiment of FIG. 5 is an example of the manner in which all information types may be classified as to which track each one is to be assigned. The principle underlying the manner in which each information type is assigned to a particular track is that all information related to a particular transaction should be recorded on the same track, so that that track is dedicated to being written or read during those operations associated with that transaction.

The various transactions provided for in the embodiment of FIG. 5 are: (a) recording of customer data, including the customer address; (b) recording of scene-related information with each exposure, including parameters characterizing lighting conditions and camera exposure settings; (c) recording by the retail order station or photofinisher of customer order information, such as the number of prints desired; (d) the recording of inspection and makeover classification correction for a given frame by the photofinisher; (e) the recording of a summary of makeover data or print reorder data applicable to the entire film roll; (f) the recording of instructions for a film to video player; (g) the recording of instructions for electronic print processing; and (h) the recording of audio. In general (but not always) each of the magnetic recording tracks illustrated in FIG. 1 is dedicated to one of the foregoing transactions (a) through (h). The result is that during recording the amount of searching for an available recording location is minimized while during playback the amount of searching through data irrelevant for a particular operation is also minimized. For example, during the classification operation, in which the optimum print exposure condition for each frame is determined, all scene-related information potentially helpful in determining the proper classification may be obtained by reading data from a single track, namely the camera-dedicated track C0 in each exposed frame (frames 1–25). No other track need be read.

Preferred Data Architecture

Figure 6:
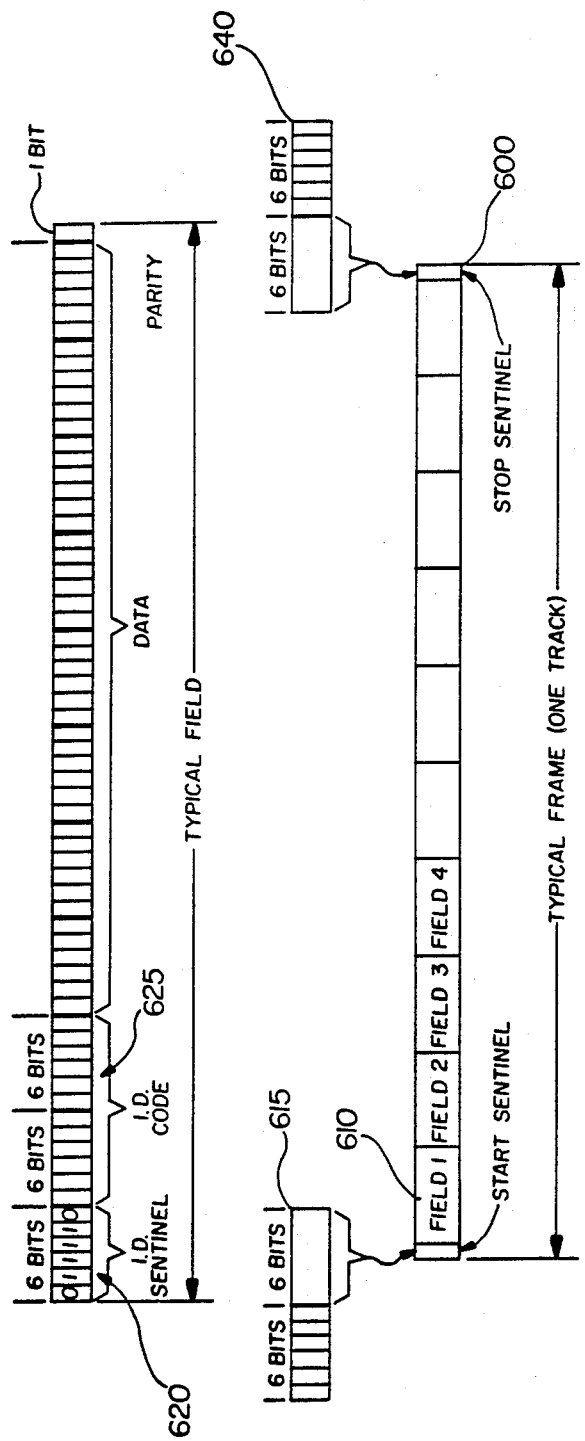
FIG. 6 is a diagram illustrating the preferred data format used in the dedicated tracks of FIG. 1 or FIG. 3.

As previously described herein with respect to FIG. 1, the data recorded magnetically on the film strip 100 is divided into frames exposed by the camera (frames 1–25) as well as the film leader (frame 0), the data within each frame being allocated among a plurality of dedicated tracks within the frame. FIG. 6 illustrates the preferred data format within each track of each frame.

In FIG. 6, each track 600 has the length of one frame and is divided into a plurality of fields 610. Each track 600 includes a predicate start sentinel 615 at its starting end (the lefthand end of the track in FIG. 6 where the head begins its scanning of the track 600). Each field includes a predicate ID sentinel 620 followed immediately by an ID code 625. The purpose of the track start sentinel 615 is to notify the read/write system in the camera or in the photofinishing hardware of the beginning location of the track 600. The purpose of the field ID sentinel 620 is to notify the same system of the beginning location of each succeeding field in the track 600. The purpose of the ID code 625 is to identify the type of information recorded in the following field.

The ID code is recorded in the beginning of each field and is determined by the information type which follows it. For example, if the camera 200 of FIG. 2 is about to record the level of scene luminance observed by sensors on the camera during exposure of the frame, the camera first causes a unique ID code to be recorded just ahead of the data representing the scene luminance level. In the simplest embodiment, a unique ID code is assigned to each parameter or information type which may be recorded on the film, so that the ID codes for all possible information types constitute a large dictionary. Inasmuch as the same dictionary must be employed by all stages in the life cycle of the film (e.g., camera, photofinisher, etc.), identical read only memories are provided at each stage, each of these memories embodying a universal ID code dictionary and controlling the reading and writing of ID codes at each stage of film use.

The advantage is that the placement of a particular parameter within the track 600 by the camera need not be previously known by the photofinisher in order for the photofinisher to be able to find that parameter on the track, since the photofinisher may simply refer to the corresponding ID code recorded by the camera. This same advantage holds between any other separate components, where one component writes data onto the film and the other independently reads the data from the film at a later time and, typically, at a different location.

One exemplary embodiment of a universal ID code dictionary is illustrated in FIG. 7. The dictionary of FIG. 7 is implemented as a set of microcodes stored in a read only memory 700 connected to the microprocessor of FIG. 2. The read only memory 700 of FIG. 7 defines a two-character ID code for each parameter which may be recorded. In this embodiment, the ID codes start at AA and end at HI, as just one possible example. While FIG. 7 depicts each ID code as being associated with the name of a particular parameter, in practice each ID code would be associated with the buffer or memory location of that parameter in the recording system so as to identify the corresponding data in terms of its location prior to being recorded. A system designer may use FIG. 7, for example, to construct the actual machine language content of the read only memory 700, depending upon the particular system design employed.

The binary bits recorded for each alphanumeric symbol representing a particular piece of information (e.g. scene luminance or customer address) or for one of the two-character ID codes of FIG. 7 are defined in accordance with the table of FIG. 8. The table of FIG. 8 is represented as a set of microcodes stored in a read only memory 800 connected to the microprocessor of 215. Each alphanumeric symbol is represented by a pattern of six binary bits. The read only memory 800 defines a universal symbol dictionary which is used to perform reading and writing of data on the film at all stages of film use. The table of FIG. 8 is derived from the ASCII standard symbols.

The read only memory 800 also defines the six-bit patterns which are reserved for control purposes and which therefore may not be used for for information or data. These reserved symbols are set forth in the exemplary table of FIG. 9, and include the control symbols illustrated in FIG. 6, including the start symbol 615, the ID sentinel 620, a frame stop symbol 640 and the compliments of the start and stop sentinels 615 and 640. Other symbols are reserved in FIG. 9 in order to permit the skilled system designer to exercise other read or write controls as desired.

Referring again to FIG. 6, the last (right-most) character at the conclusion of each data field is a six-bit parity character. The first (most significant) two bits of the parity character are always 10, so as to avoid any parity character assuming the value of any of the reserved characters of FIG. 9. The middle two bits of the parity character of FIG. 6 are reserved for future uses. The last (least significant) two bits provide single bit parity for: (a) the ID code at the beginning of the field and (b) the remaining data characters in the field, respectively.

In FIG. 2, the microprocessor 215 in the camera 200, while referring to the read only memory 240 for the track locations of the various allowed parameters, must also refer to read only memories 700 and 800 for the universal ID code dictionary and universal symbol dictionary in order that subsequent readers of the data recorded by the camera 200 may properly interpret the data.

Virtual Identification Codes for Minimum Data Overhead

As described previously with reference to FIG. 6, each field of data is preceeded by an identification code or ID code 625 comprising two six-bit characters. The remainder of the field consists of one or more six-bit characters representing a particular parameter or piece of information. For example, if the camera records the aperture size used to expose each frame, then, as one possible example, four characters would suffice, using the symbol table of FIG. 8. Specifically, if the aperture size was f 1.4, then the first character would be the six-bit byte for "f" from FIG. 8, the second would be "1", the third "." and the fourth would be the six-bit byte for "4". Unfortunately, such a scheme uses twelve identification code bits for each parameter recorded, requiring a maximum amount of overhead. (The term "overhead", as used in this specification, refers to data recorded for control or identification purposes.)

Figure 16:
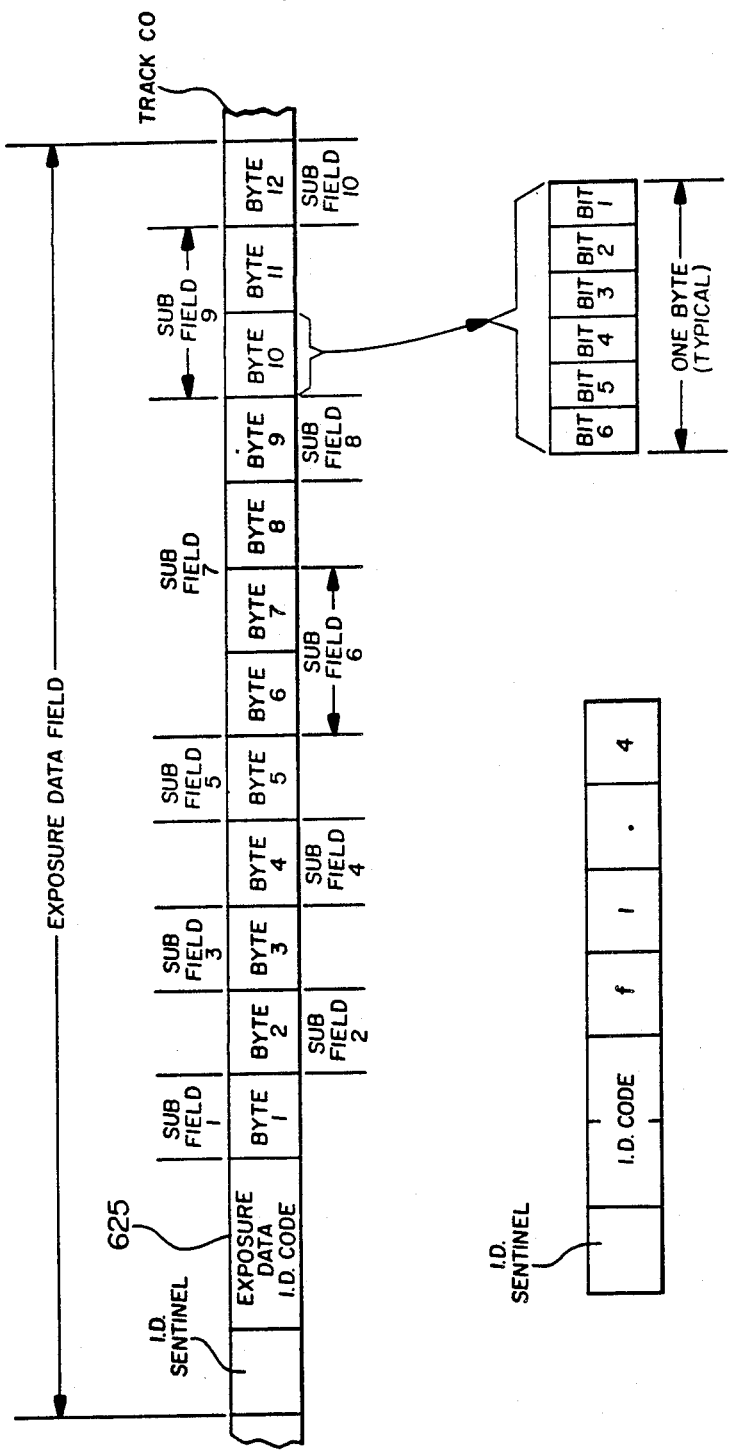
FIG. 16 illustrates the use of a virtual identification code for a data block containing several different pieces of information.

In order to minimize such overhead, the invention includes virtual identification codes which permit the recording of more than one piece of information in one field of data in FIG. 6. Referring to FIG. 16, each field is divided into a plurality of sub-fields, each sub-field containing a different piece of information. The identification code 625' at the beginning of the field is a virtual identification code serving as an address to corresponding instructions stored in a read only memory or look-up table. The instructions suffice to identify and interpret all of the individual sub-fields or information pieces in the one field.

A virtual identification code may refer to any or each one of three types of look-up tables. The first type is a bit-map look-up table of the type illustrated in FIG. 17a. The bit-map look-up table of FIG. 17a defines certain camera-recorded parameters according to the state of certain bits in certain sub-fields of FIG. 16. For example, in sub-field 1, which has one byte, if the byte is 110000 then no data has been recorded in that byte. Otherwise, the data for two camera parameters is recorded in the four least significant bits: bit 4 specifies whether data was recorded in bit 3 while bit 3 specifies whether the camera sensed that the scene luminance was beyond the exposure range of the camera (too light or too dark). The other bit patterns specified in FIG. 17a are self-explanatory.

The second type of look-up table, a state identifier look-up table, is illustrated in FIG. 17b. The state identifier look-up table specifies the sub-field locations of certain bytes, and, for each one of these bytes, specifies a byte value for each possible state of a parameter having several possible states. For example, the look-up table of FIG. 17b specifies different byte values in sub-field 2 for recording an indication that the camera orientation is normal, upside down, right side up, left side up and undetermined. As before, the byte value 110000 specifies no data. The other sub-fields specified by the look-up table of FIG. 17b are self-explanatory.

FIG. 17c illustrates the third type of look-up table, a scaling algorithm look-up table. For each sub-field (consisting of one byte or more), the look-up table stores instructions specifying byte locations to be read and an arithmetic scaling algorithm for computing the value of a recorded parameter represented by those bytes. Inversely, the look-up table of FIG. 17c may specify the inverse algorithm for computing the bit values for each specified bit location from the magnitude of a measured scene parameter (e.g. scene luminance). The camera, photofinisher and any other user of the magnetic film information exchange system may employ virtual identification codes referring to any of the three types of look-up tables of FIGS. 17a, b and c.

The example of FIGS. 17a, b and c illustrates the feature in which a single virtual identification code refers to different ones of the three types of look-up tables for various ones of the plural sub-fields in the field. In fact, each of the ten sub-fields of FIG. 16 are listed in one of the three look-up tables of FIG. 17. In an optimum mode, a single virtual identification code suffices for the recording by a camera of all possible scene-related parameters in a single field, using multiple look-up tables. As a result, the scene-related information is recorded by the camera and read back by the photofinisher with almost no searching beyond an absolute minimum amount, thus making the entire process very quick and efficient.

Exemplary Use of Dedicated Tracks in Photofinishing

Figure 10:
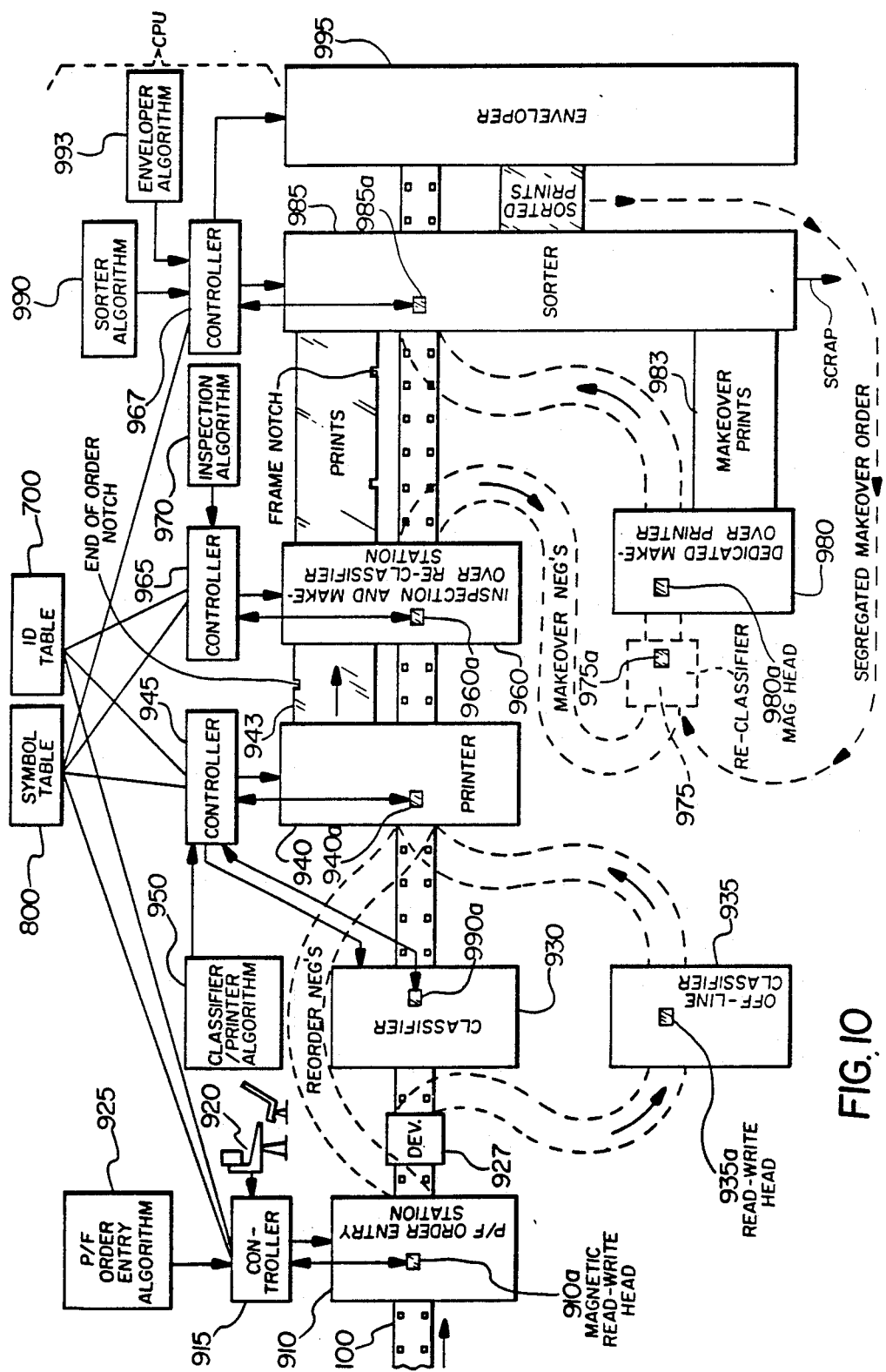
FIG. 10 is a block diagram illustrating a photofinishing system having magnetic read/write hardware including automated protocols which use the film of FIGS. 1 or 3 as a scratch pad memory for increased efficiency or performance.

Use of the dedicated film tracks for magnetic recording of information by a camera has been described with reference to the example of FIG. 2. FIG. 10 illustrates one example of the use of the dedicated film tracks (of either FIG. 1 of FIG. 3) for magnetic reading and writing in a photofinishing system. In general, such a photofinishing system employs its own version of the read only memories 240, 700, 800 for track location, an ID code dictionary and a symbol dictionary.

In FIG. 10, the film strip 100 is removed from the cartridge (or at least partially extracted to expose its leader—frame 0) at an order entry station 910. The order entry station 910 may be located either at the dealer or at the photofinishing laboratory. The order entry station has a magnetic read/write system including a head 910a and a controller (microprocessor) 915 which executes an order entry algorithm stored in memory 925. This algorithm defines the correct track locations in frame 0 for the recording of customer-related information, including the number of prints desired, the customer's name and address, etc., entered in at a terminal 920 or read directly from one of the camera tracks.

A developer 927 develops the film strip 100 to form a negative image in each exposed frame.

Figure 11:
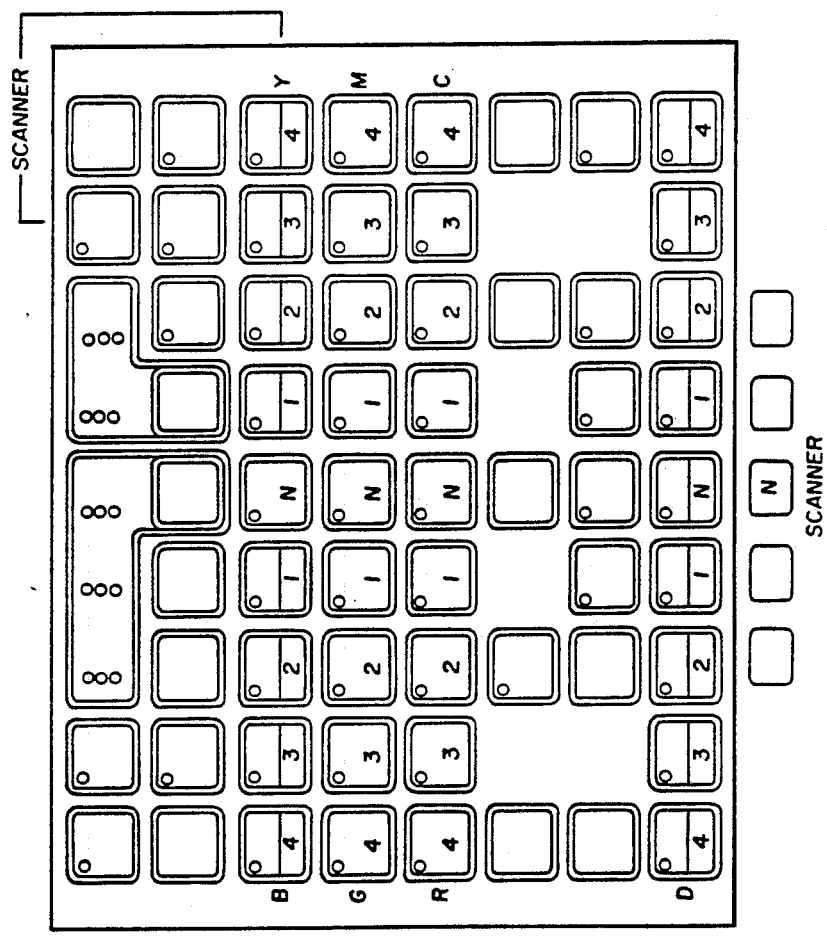
FIG. 11 illustrates a typical operator's keyboard used in the photofinishing system of FIG. 10 to classify developed negatives for correct print exposures.

The film strip 100 then enters a classifier 930 which determines the optimum print exposure condition for each frame on the film strip 100. The classifier may do this either manually under control of a human operator or automatically using an image sensor as is done in the Eastman Kodak 3510 color printer or the Eastman Kodak CCAS 35 color printer. An exemplary manual control terminal included in the manual version of the classifier 930 is illustrated in FIG. 11. The luminance value at which the photosensitive print paper is to be exposed through a given negative image may be changed from a nominal value (gray level) by arbitrary values $-4$ to $+4$ by pressing one of the appropriate buttons in the row of buttons labelled "D" on the left side of the terminal of FIG. 11. The intensity of red, green and blue light at which the print paper is exposed may be altered from pre-defined nominal values in similar manner by arbitrary values $-4$ to $+4$ by pushing the appropriate buttons in the corresponding one of the rows of buttons labelled "R", "G" and "B", respectively. The resulting classification (defined by the luminance, red, green and blue print exposure values) is recorded by the classifier's magnetic head 930a in the appropriate one of the dedicated tracks (in accordance with the track allocation defined in a read only memory such as the memory 240 of FIG. 5).

It should be noted that if data previously recorded on the film strip 100 indicates that it has been previously developed and printed (so that a classification value is stored in each frame in the appropriate track), then the developer 927 and the classifier 930 are automatically bypassed.

A printer 940 receives the film strip 100, reads the classification previously recorded in each frame by the classifier 930, and exposes one frame in a roll of photosensitive paper 937 through the corresponding negative frame with an exposure whose characteristics meet the recorded classification. The printer 940 includes its own magnetic read/write system, such as a magnetic head 940a, a controller 945 and a memory 950 storing a classifier/printer algorithm. This algorithm governs the magnetic reading and writing by the printer 940 and classifier 930 in accordance with the dedicated tracks format of FIG. 1 or FIG. 3. For example, the printer/classifier algorithm requires the controller 945 to determine whether camera tracks (tracks C0 through C3) were previously recorded on the film strip 100. If so, the dedicated track film format of FIG. 1 applies and scene-related information (if used by the classifier 930 to enhance the accuracy of the classification operation) may be found by reading the appropriate track. Likewise, the printer/classifier algorithm in the memory 950 tells the printer 940 where to find the classification value recorded in each frame by the classifier 930.

An operator at an inspection station views each of the prints on the print roll 943 to determine whether a makeover print is required for any of them. Under control of a controller 965 which executes an inspection algorithm stored in a memory 970, data is recorded on the film strip 100 in the appropriate track by the inspection station's magnetic head 960a reflecting the necessity (if any) of a makeover print in a given frame. Presumably the makeover was necessitated by an incorrect classification, and a correction to the original classification must be computed and recorded in the appropriate track on the film strip 100. In one embodiment, this is done by the inspection station 960 itself, while in another embodiment this is done at a separate re-classifier 975 having its own magnetic recording head 975a and recording system for this purpose. The film strip 100—which may be included in a roll of many such film strips—is sent to a makeover printer 980, typically by transferring the entire roll. The makeover printer 980 has its own magnetic read/write system, including magnetic head 980a, with which it may read the appropriate data in the appropriate tracks to determine which of the frames require makeover prints and, for each one of these, what the original classification value was and what the classification correction is. From this information, the makeover printer exposes the appropriate frames on the film strip 100 using the corrected classification values.

A roll of makeover prints 983 produced by the makeover printer 980, the roll of prints 943 produced by the printer 940 and the roll of developed film including the film strip 100 are all fed to a sorter 985. The sorter collates the individual original and makeover prints with the corresponding film strips into complete customer orders, discarding any original prints whenever corresponding makeover prints have been made. Whether a corresponding makeover print has been made is determined by the sorter 985 through its magnetic read/write system including a controller 987 which executes a sorter algorithm stored in a memory 990 and the sorter'magnetic head 985a. The head 985a is simply directed to read the required data from the appropriate one of the dedicated tracks on the film strip 100 by the controller 987, in accordance with the track allocation illustrated in FIG. 5.

Photofinishing Information Exchange Algorithms

The dedicated track format of FIG. 1 is exploited by photofinishing equipment having magnetic read/write hardware, using algorithms illustrated in FIGS. 18a-f, in accordance with the following description.

Order Entry Algorithm

Figure 18A:
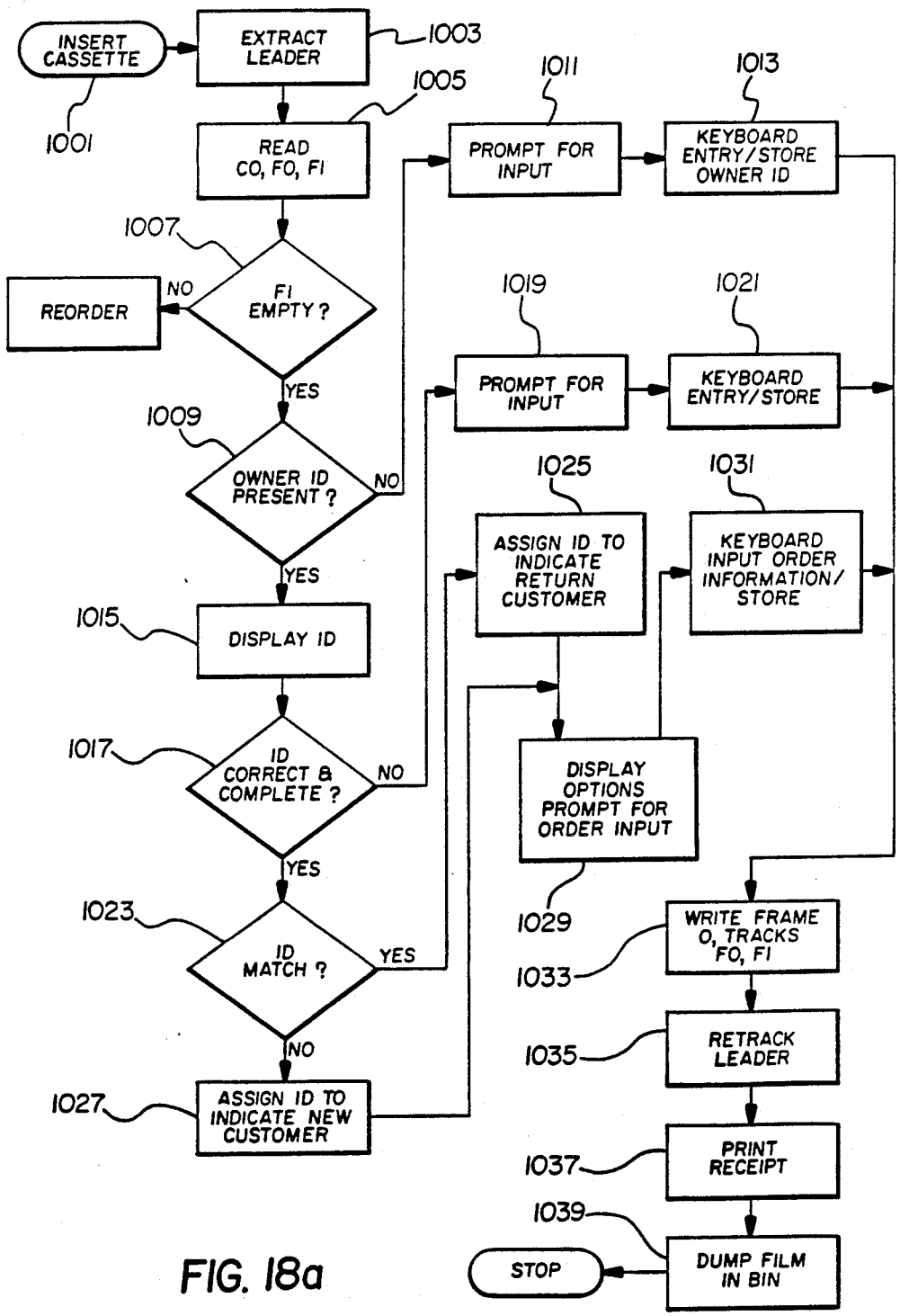
FIG. 18a is a flow diagram illustrating the dealer order entry process.

Referring to FIG. 18a, an order entry station, such as one used by a film dealer, receives a cassette of film of the type illustrated in FIG. 1 from a customer. Presumably, the customer has exposed the film in his camera and desires that the film be processed for prints. Under these circumstances, the process which is followed is illustrated in FIG. 18a and is described with reference to the system illustrated in FIG. 10. The dealer would have only a few of the components illustrated in FIG. 10, these being a P/F order entry station 910, a controller 915, a memory 925 storing the P/F order entry algorithm illustrated in FIG. 18a and a terminal 920. The customer's cassette containing the film 100 is inserted into the order entry station 910 (block 1001 of FIG. 18a). The order entry station 910 includes means of the type well-known in the art for extracting the film leader out of the cassette so that the order entry station magnetic head 910a can read data (if any) previously recorded in dedicated tracks on the film leader (frame 0). (Blocks 1003, 1005 of FIG. 18a.) The controller 915 first determines (through the head 910a) whether track F1 of frame 0 is empty (block 1007). If data is detected in track F1 (NO branch of block 1007) the controller 915 immediately concludes that the film cassette is a customer reorder for prints, was developed previously and therefore should be handled separately. Otherwise (taking the YES branch of block 1007) the controller 915 next determines whether the owner's name and address (ID) was previously recorded—presumably using a camera of the type illustrated in FIG. 2—on camera track C0 of frame 0, in accordance with the dedicated tracks allocation of FIG. 5 (block 1009 of FIG. 18a). If not, taking the NO branch of block 1009, the controller 915 causes the display on the terminal 910 to prompt the dealer to input the owner ID (block 1011). The dealer then inputs the owner ID on the keyboard 920 (block 1013). Otherwise, taking the YES branch of block 1009, the controller 915 causes the terminal 920 to display the owner ID previously recorded in the film. The controller 915 then determines whether the owner ID is complete or correct, given prior inputs from the terminal 920 (blocks 1015 and 1017 of FIG. 18a). If the ID is incorrect or incomplete, the controller 915 causes the display on the terminal 920 to prompt the dealer for a correction of the owner (block 1019) so that the dealer may respond by making the correct entry at the keyboard 920 (block 1021 of FIG. 18a). If the owner ID is correct and complete (YES branch of block 1017) the controller 915 then determines (block 1023) whether the customer ID indicates a return customer. This determination would be made by matching the customer's ID with the file of all customer ID's kept in the dealer's computer memory. As a variation on this theme, it may be that the customer has used a camera of the type illustrated in FIG. 2 which could have the capability of recording a particular dealer ID on the film exposed by that camera. In such a case, the camera may have been programmed by the dealer that sold it to always record that dealer's ID on all film processed by the camera. Alternatively, means could be provided for permitting the customer to program his camera to record certain dealer ID numbers.

Assuming such a match was found at block 1023, the controller 915 causes a special indication to be recorded on film indicating a return customer (block 1025). On the other hand, if no match was found, then the controller 915 causes another indication (or NO indication) to be recorded on the film indicating that the customer is not a return customer (block 1027). In response to the results of the comparison performed at block 1023, the controller 915 then causes a terminal 920 to display options corresponding to the status (new or return) of the customer ID, such options involving special handling privileges accorded return customers or special price breaks to attract new customers or whatever strategy the dealer has previously determined and stored in memory 925 (block 1029). Depending upon the options displayed at the terminal 920, the dealer may input special instructions at the terminal 920 to be recorded on the film, such instructions specifying any special handling or pricing structure or the like (block 1031). All information recorded in any of the keyboard entries in blocks 1013, 1021 or 1031 are recorded through the head 910a on frame 0 of tracks F0 or F1, depending upon the dedicated track allocation illustrated in FIG. 5 (block 1033). The order entry station 910 then retracts the film leader back into the cartridge (block 1035), prints a receipt for the customer (block 1037) and dumps the film cartridge into a bin for shipment to a photofinisher (block 1039).

PHOTOFINISHER ENTRY STATION ALGORITHM

Figure 18B:
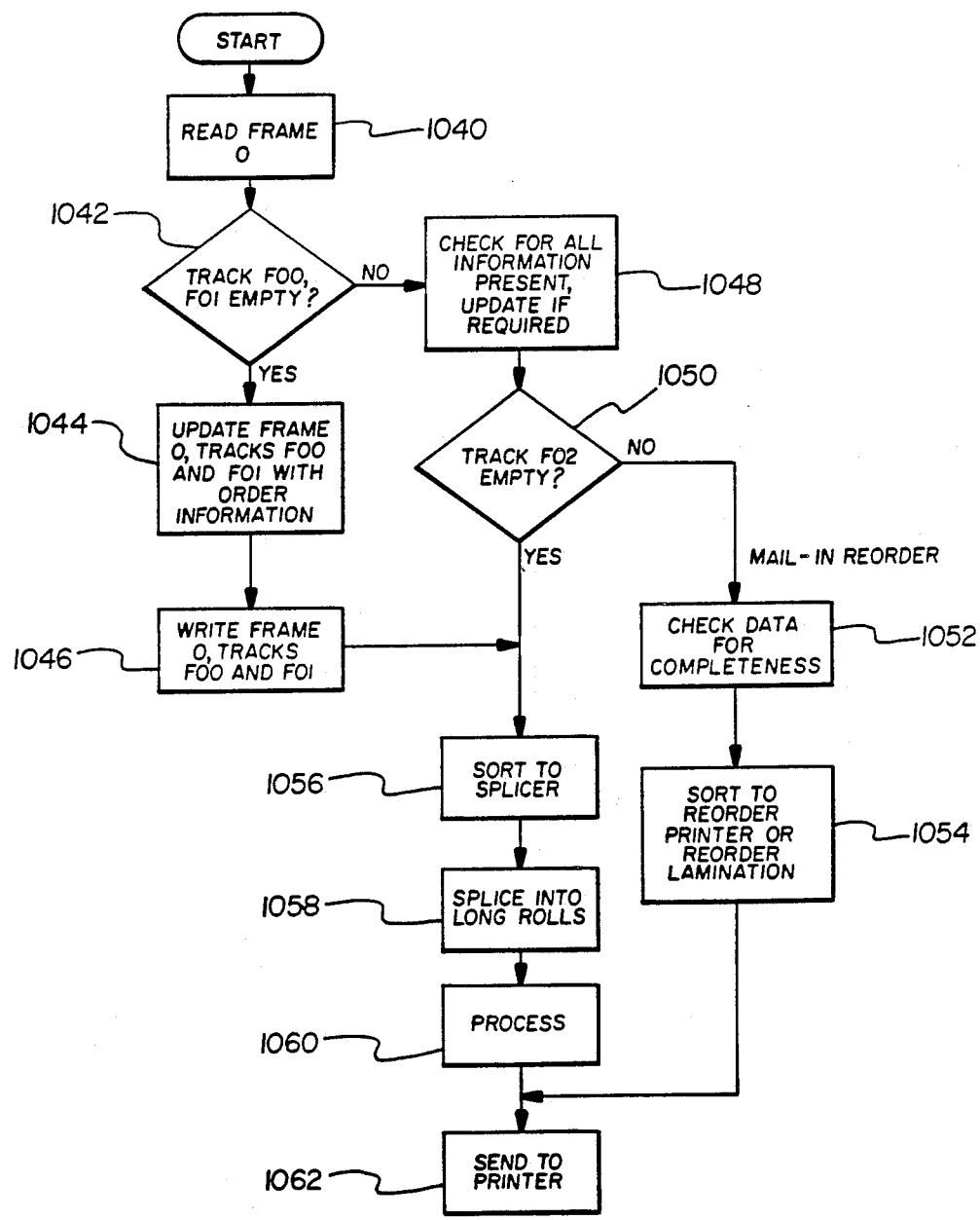
FIG. 18b is a flow diagram illustrating the photofinisher order entry process.

As illustrated in FIG. 10, the photofinisher system itself may include its own order entry station, enabling it to use computerized automation to process film received from the dealer and even film received directly from a customer. Of course, such a photofinisher order entry station would operate in nearly the same manner as that described in connection with the dealer order entry station process of FIG. 18a. FIG. 18b, however, highlights the differences between the operation of a photofinisher order entry station and a dealer order entry station. Referring to FIG. 18b, the photofinisher order entry station 910 of FIG. 10 extracts the leader from the film cartridge in order to read the data recorded on frame 0 (block 1040). The controller 915 of the photofinisher order entry station then determines whether tracks F00 and F01 are empty (block 1042). If so, the process described previously in connection with FIG. 18a is used to update the frame 0 data to be recorded in tracks F00 and F01 representing the customer and order information in accordance with the dedicated track allocation of FIG. 5 (block 1044). Such data is then recorded through the head 910a and the requisite locations on tracks F00 and F01 of frame 0 (block 1046).

On the other hand, if tracks F00 and F01 were not empty as the film was originally received (the NO branch of block 1042), the controller 915 prompts the photofinisher operator (in the manner described previously in connection with FIG. 18a) to make sure that all of the information previously recorded is correct and to update it or correct it otherwise (block 1048). Following this, at block 1050 the controller 915 then determines whether track F02 of frame 1 is empty. If track F02 is not empty (NO branch of block 1050) this indicates that the film cartridge was submitted as a print reorder by the customer. That this is so may be seen from the dedicated track allocation of FIG. 5 wherein track F02 only contains data pertaining to the printing process such as makeover corrections or pertaining specifically to reorder instructions. In this case, the controller 915 prompts the photofinisher operator to check the data on track F02 for completeness (block 1052) and then sends the reorder film cartridge to a printer dedicated to processing reorders or for reorder lamination (block 1054) from which it is ultimately sent to a printer.

On the other hand, if track F02 was empty as the film was originally received (YES branch of block 1050) the film cartridge is sent to a splicer (block 1056) to be spliced into a long roll consisting of many customer orders (block 1058) for processing or developing (block 1060) and then for printing (block 1062). The printer operation represented by block 1062 of FIG. 18b corresponds to the printer algorithm of FIG. 18c.

The updating process of block 1044 may require the photofinisher operator to enter the customer ID, the photofinisher ID, the customer order information and a dealer ID (if applicable) if no such data has previously been recorded. Such would be the case if the customer's camera was of the ordinary type not having the magnetic recording capability of the camera illustrated in FIG. 2.

Printer Operation Algorithm

Figure 18C:
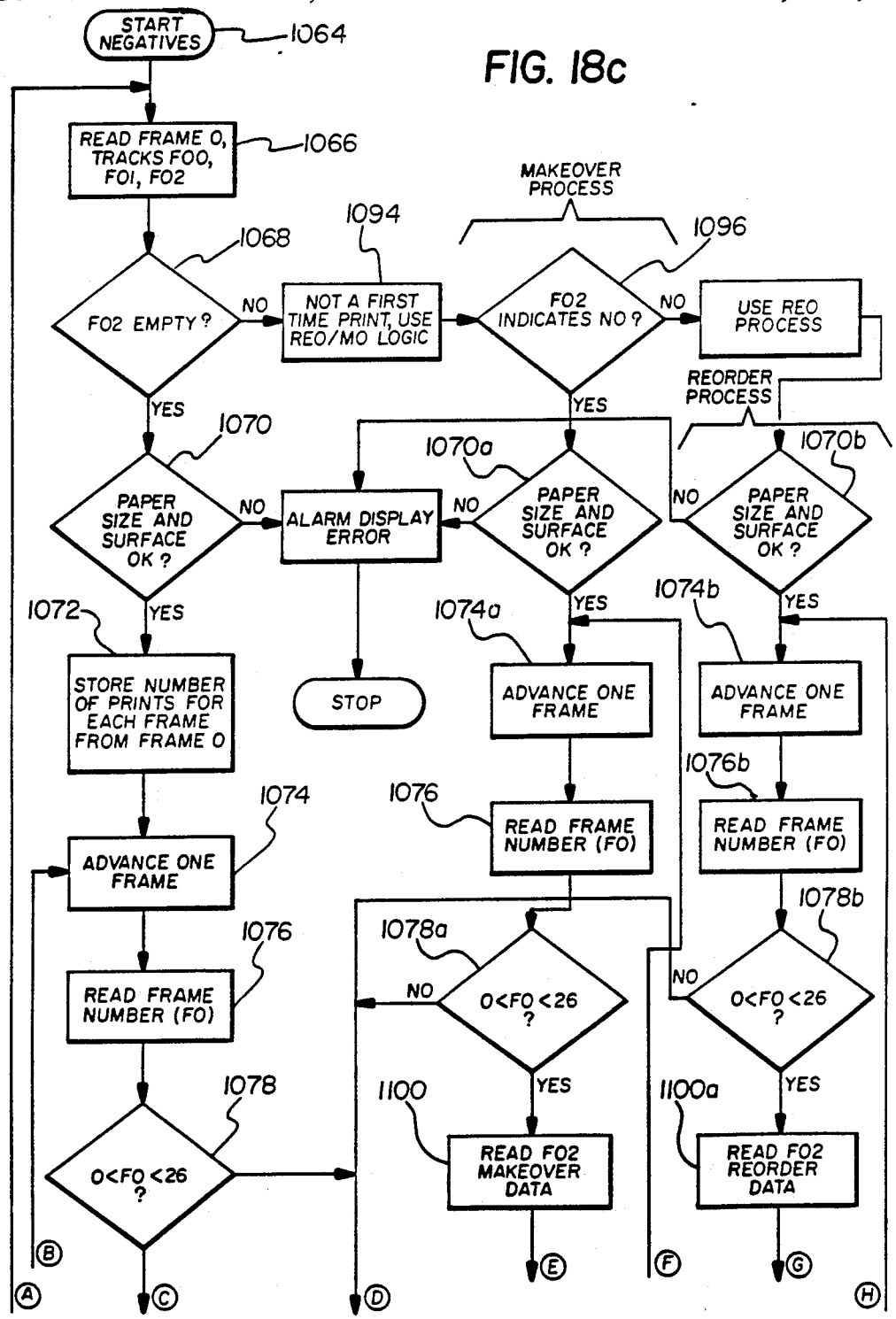
FIG. 18c is a flow diagram illustrating the printer process.
Figure 18C:
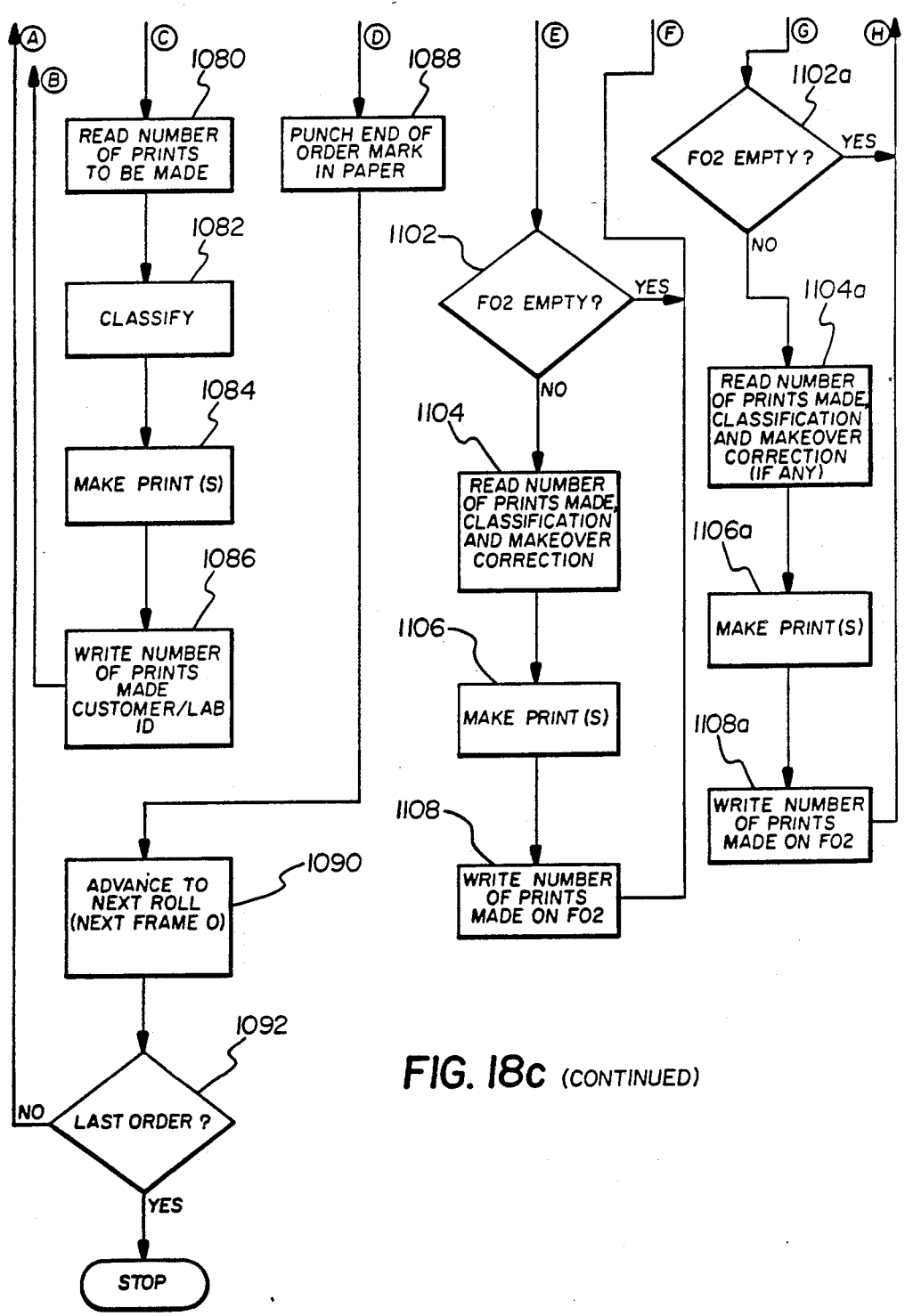

As discussed previously in connection with FIG. 10, the photofinisher system includes a printer 940 associated with a controller 945 connected to a memory 950 storing a printer algorithm and a classifier algorithm, such algorithms being illustrated in the flow diagram of FIG. 18c. The operation of the printer 940 is determined by the classification assigned to each image on the developed negative 100 by a classifier 930. Thus, after the film leaves the order entry station and is developed in the processor developer station 927, the resulting negative image is classified by the classifier 930. The resulting classification determines the exposure used by the printer 940 to expose a frame on a photosensitive paper roll 943 through the negative image.

Execution of the classifier/printer algorithms by the controller 945 will now be described with reference to FIG. 18c. In the description that follows, it is assumed that many strips of film 100 have been spliced together into a long roll which has already been processed in the developer 927. Further, the classifier 930 causes the classification of each frame to be magnetically recorded via the head 930a in track F01 of that frame, in accordance with the dedicated track data allocation of FIG. 5. The roll of developed negatives travels through the printer 940 (block 1064 of FIG. 18c). The controller 945 causes the head 940a to read the data in tracks F00, F01 and F02 of frame 0 of each individual film order in the roll as it arrives in the printer 940 (block 1066). The controller 945 determines at the beginning of each order whether track F02 is empty (block 1068). If track F02 is empty (taking the YES branch of block 1068), a nominal printer algorithm corresponding to the lefthand vertical column of FIG. 18c is implemented. On the other hand, if data previously recorded in track F02 indicates that the negative images on the strip of film are to be printed pursuant to a makeover requirement, then the negatives are processed in accordance with a makeover process indicated generally as the middle vertical column of FIG. 18c. Finally, if data previously recorded in track F02 of frame 0 indicates that the negatives were submitted pursuant to a customer print reorder, then a reorder process algorithm generally indicated at the right hand vertical column of FIG. 18c is followed. The determination of the status of track F02 of block 1068 facilitates these decisions because the dedicated track allocation of FIG. 5 is such that only reorder and/or makeover instructions are recorded in track F02 of frame 0.

If track F02 is empty, the YES branch of block 1068 is followed to the nominal printer process in the lefthand vertical column of FIG. 18c, as mentioned previously. First, the controller 945 determines whether the paper size and surface type specified in the customer order instructions recorded in frame 0 correspond to the paper size and surface type of the photosensitive paper already loaded into the printer 940 (block 1070). If not, taking the NO branch of block 1070, the controller 945 displays an alarm or error unless or until the paper stock in the printer 940 is changed. Otherwise, taking the YES branch of block 1070, the controller 945 determines, from the customer order data recorded in frame F00, the number of prints to be made for each frame on the film by frame number. This data is stored in memory in the controller 945 (block 1072). Then, the negative 100 is advanced by one frame in the printer 940 (block 1074) and the controller 945 reads the current frame number through the head 940a (block 1076). The controller 945 then determines whether the current frame number is within the total number of frames on the filmstrip (block 1078). If the frame number falls within the allowed range, then the current frame includes an image to be developed and, taking the YES branch of block 1078, the controller 945 scans memory to determine the number of prints to be made for that particular frame (block 1080). Further, the controller 945 enables the classifier 930 to classify the particular frame (block 1082) and causes the printer to print the required number of prints of that frame in accordance with the classification made by the classifier 930 (block 1084). Then, the number of prints made is recorded in track F01 of that frame (block 1086) and the film is advanced to the next frame (block 1074) so that the cycle may be repeated.

Returning to block 1078, if the current frame number did not fall within the maximum number of frames on the film (NO branch of block 1078), this indicates that the end of the customer's order has been reached, and the controller 945 causes the printer 940 to place a special notch at one edge of the print roll 943 corresponding to the location of the print of the current frame, the special notch comprising an end of order mark on the print paper, in accordance with a well-known convention of the film print processing. (Block 1088.) Then the controller 945 causes the roll of negatives to be advanced to the leader (frame 0) of the next customer order (block 1090). The controller 945 then determines whether the previous order was the last order on the spliced negative roll and, if so, the operation is stopped (YES branch of block 1092). Otherwise, taking the NO branch of block 1092, the entire operation is repeated for the next customer order, returning to block 1066.

Returning now to block 1068, if it is determined that track F02 is not empty, this would indicate that the roll of negatives is not submitted for the first time printing (block 1094) so that either the makeover process or the reorder process must be used. Therefore, the controller 945 determines at block 1096 whether the data recorded on track F02 indicates makeover instructions only (YES branch of block 1096) or indicates reorder instructions (NO branch of block 1096). If the track F02 data indicates makeover instructions only, then the controller 945 operates in a manner similar to that described previously by the frist determining whether the paper size and surface are correct (block 1070a), advances the film one frame (block 1074a), reads the frame number (block 1076a) and determines whether the end of order has been reached (block 1078a). If not, the controller 945 reads the makeover data or instructions previously recorded on track F02 (block 1100). If track F02 of the current frame is empty then, taking the YES branch of block 1102, this indicates that no makeover prints are required of the current frame so that the negatives are advanced by one more frame, returning to the block 1074a, and the process is repeated. Otherwise, taking the no branch of block 1102, the controller 945 reads the number of prints to be made of the current frame, the classification of the current frame of the makeover correction for that frame recorded on track F01 (block 1104). The controller 945 then causes the printer 940 to make the corresponding print or prints (block 1106). Then, the controller 945 reads the number of prints previously made (if any) from track F02, adds to that the number of prints just made by the current printing operation and rerecords the sum in the proper location on track F02. The entire process is returned to block 1074a so that the film is advanced to the next frame and the cycle is repeated. (Block 1108.)

Returning to block 1096 of Fig. 18c, the controller 945 may determine that track F02 contains reorder instructions, indicating that the negatives have been submitted by a customer for a reorder of prints. Accordingly, the controller 945 implements the reorder process of Fig. 18c (NO branch of block 1096). To begin the reorder process of Fig. 18c, the controller 945 determines whether the paper size and surface specified in the reorder customer information recorded on track F02 corresponds to the paper size and paper surface type already loaded into the printer 940 (Block 1070b of Fig. 18c). If the paper size or surface does not match that specified (NO branch of block 1070b) then the controller 945 causes an alarm to be displayed to the operator and stops the process. Otherwise, (YES branch of block 1070b) the controller causes the printer 940 to advance the film 100 by one frame (block 1074b) and reads the frame number recorded in either track CO or track F00 of the next frame (block 1076b). The controller 945 then determines whether that frame number falls within the maximum number of frames within that customer's order (block 1078). If not (NO branch of block 1078b) the frame number indicates that the end of the order has been reached, and therefore the controller 945 causes the printer 940 to punch a notch, or end of order mark, in the corresponding location in the roll of prints 943 (block 1088 of Fig. 18c). Otherwise, taking the YES branch of block 1078b, the controller 945 causes the reorder data recorded in track F02 of the present frame to be read out via the head 940a (block 1100a) so that these instructions may be stored and executed. The remainder of the operation of the reorder process is the same as the makeover process, specifically blocks 1102, 1104,1106 and 1108, the corresponding blocks in the reorder process of FIG. 18c being labelled 1102a, 1104a, 1106a and 1108a, respectively.

INSPECTION PROCESS

Figure 18D:
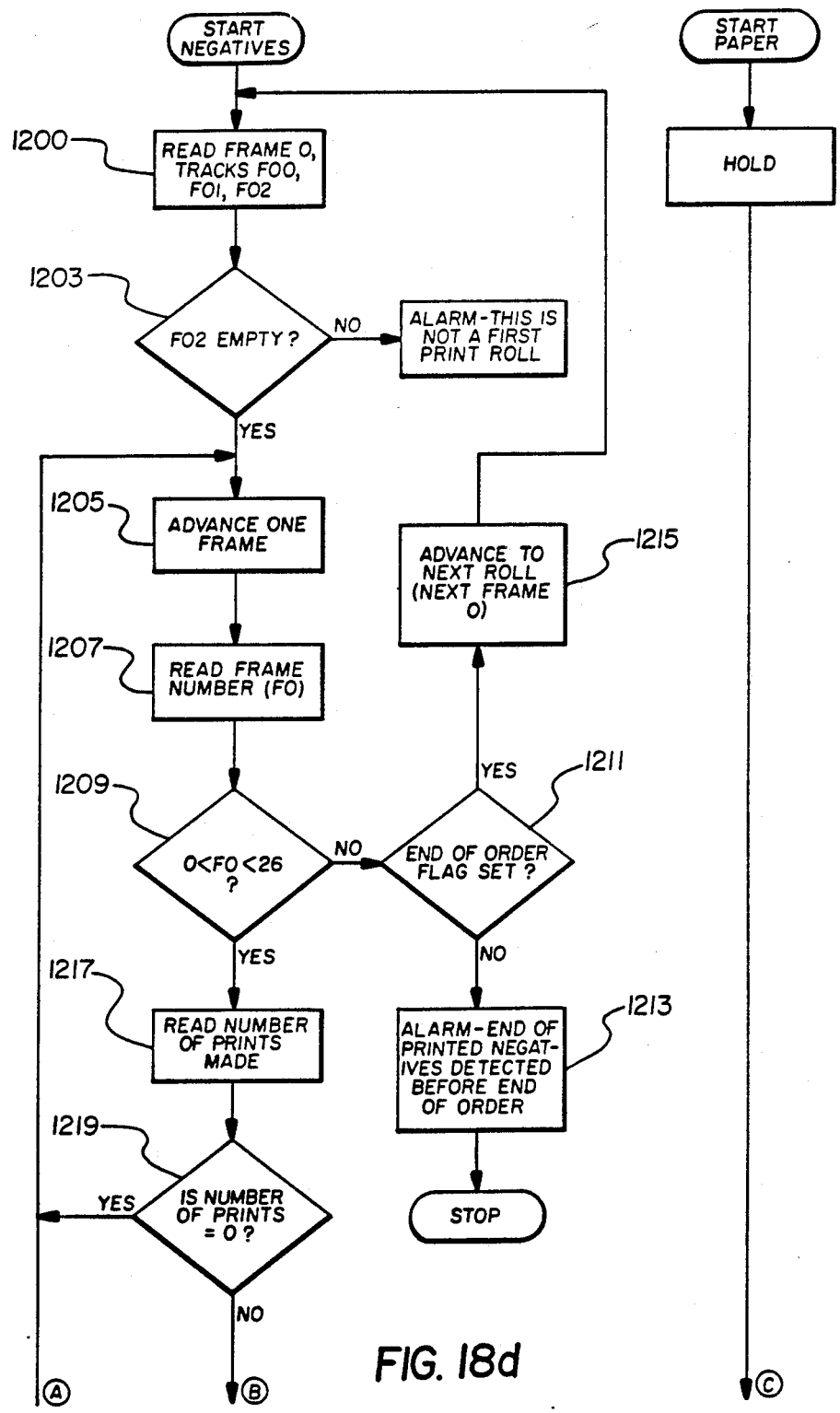
FIG. 18d is a flow diagram illustrating the inspection process.
Figure 18D:
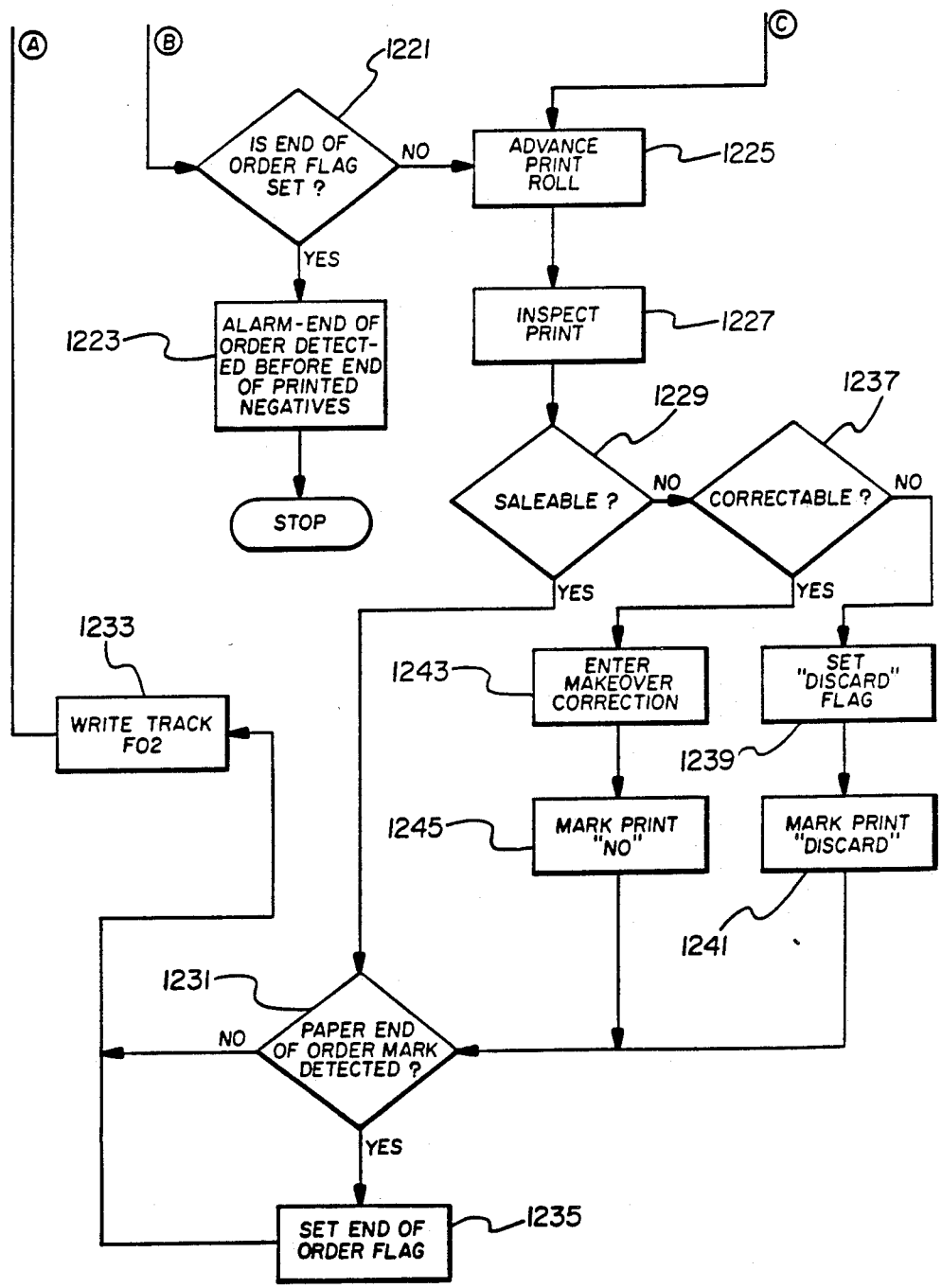

The inspection station 960 of FIG. 10, under control of the controller 965, follows an inspection algorithm stored in the memory 970, the inspection algorithm being illustrated in the flow diagram of FIG. 18d. The inspection station 960, via the magnetic head 960a, reads the data frame 0, tracks F00, F01 and F02 (block 1200 of FIG. 18d). The controller 965 determines whether or not track F02 is empty (block 1203). If track F02 is not empty, this indicates that the current order requires makeover or reorder, and an alarm or indication is raised (NO branch of block 1203). In a special case, the inspection station 960 may halt operation at this point if it is not supposed to handle reorders or makeovers. Otherwise, taking the YES branch of block 1203, the inspection station 960 advances the negatives by one frame (block 1205 of FIG. 18d) and reads the frame number of the next frame (block 1207). The controller 965 determines whether or not that frame number falls within the maximum number of frames on a given roll of film (block 1209). If not, taking the NO branch of block 1209, the frame number indicates the end of the particular customer order has been reached and the controller 965 next determines whether an end of order flag has been set (block 1211). The setting of this flag will be discussed below. If not (NO branch of block 1211), the negatives and the prints have gotten out of synchronization with each other (block 1213) and an alarm is sounded. Otherwise, the end of order has properly been reached and the roll of negatives is advanced to frame 0 (the leader) of the next customer order or roll (block 1215), and the entire cycle is repeated.

Returning to block 1209, if the current frame number does not indicate that the end of customer order has been reached (YES branch of block 1209) the controller 965 reads (through the head 960a) the number of prints to be made of that particular frame in accordance with the customer order data previously recorded on track F01 of that frame (block 1217). If the number of desired prints is 0 for this frame (YES branch of block 1219), then the process returns to block 1205 of FIG. 18d, to advance the negatives one frame and repeat the foregoing steps for the next frame. Otherwise, taking the NO branch of block 1219, the controller 965 determines whether the end of order flag has been set. If so, this would indicate (as before) that the roll of negatives and the roll of prints have gotten out of synchronization with respect to each other (YES branch of block 1221) and an alarm is sounded (block 1223). Otherwise, taking the NO branch of block 1221, the roll of prints 943 is advanced by a number of frames equal to the number of prints desired (block 1225). These prints are inspected by an operator (block 1227) and a determination is made whether each print is saleable (block 1229). If so, taking the YES branch of block 1229, the operator makes a keyboard entry indicating that the print is saleable, and the controller 965 responds by determining whether the end of order mark or notch has been detected on the roll of prints (block 1231). If not, the controller 965 causes the actual number of prints to be recorded in track F02 of the current frame (block 1233), and the process returns to block 1205 where the negatives are advanced to the next frame, and the process is repeated. Otherwise, taking the YES branch of block 1231, in response to the end of order mark or notch being detected on the roll of prints 943, the controller 965 sets the end of order flag (block 1235). As before, the controller 965 then causes the number of prints to be written in track F02 (block 1233) and repeats the entire cycle for the next frame.

Returning to block 1229, if the operator signals the controller 965 that the current print is not saleable (NO branch of block 1229), then the controller 965 prompts the operator to determine whether or not the deficiency could be corrected by changing the exposure to make a new (makeover) print (block 1237). If not (NO branch of block 1237), the operator signals the controller 965 and the controller 965 sets a discard flag (block 1239) while the operator marks the print as a discard (block 1241), typically with a grease penciled "X" on the print. On the other hand, if the exposure is correctable (YES branch of block 1237) then the operator (either human or automatic with computer-executed algorithm) determines or computes the makeover correction to the exposure classification (previously determined by the classifier 930) (block 1243) while the operator visibly marks the print as a makeover (typically with a grease pencil diagonal line through the print). Thereafter, the process goes to block 1231 and continues in the manner described previously. However, in this case, at block 1233, what is written in track F02 includes the makeover correction to the original classification.

Order Assembly Process

Figure 18E:
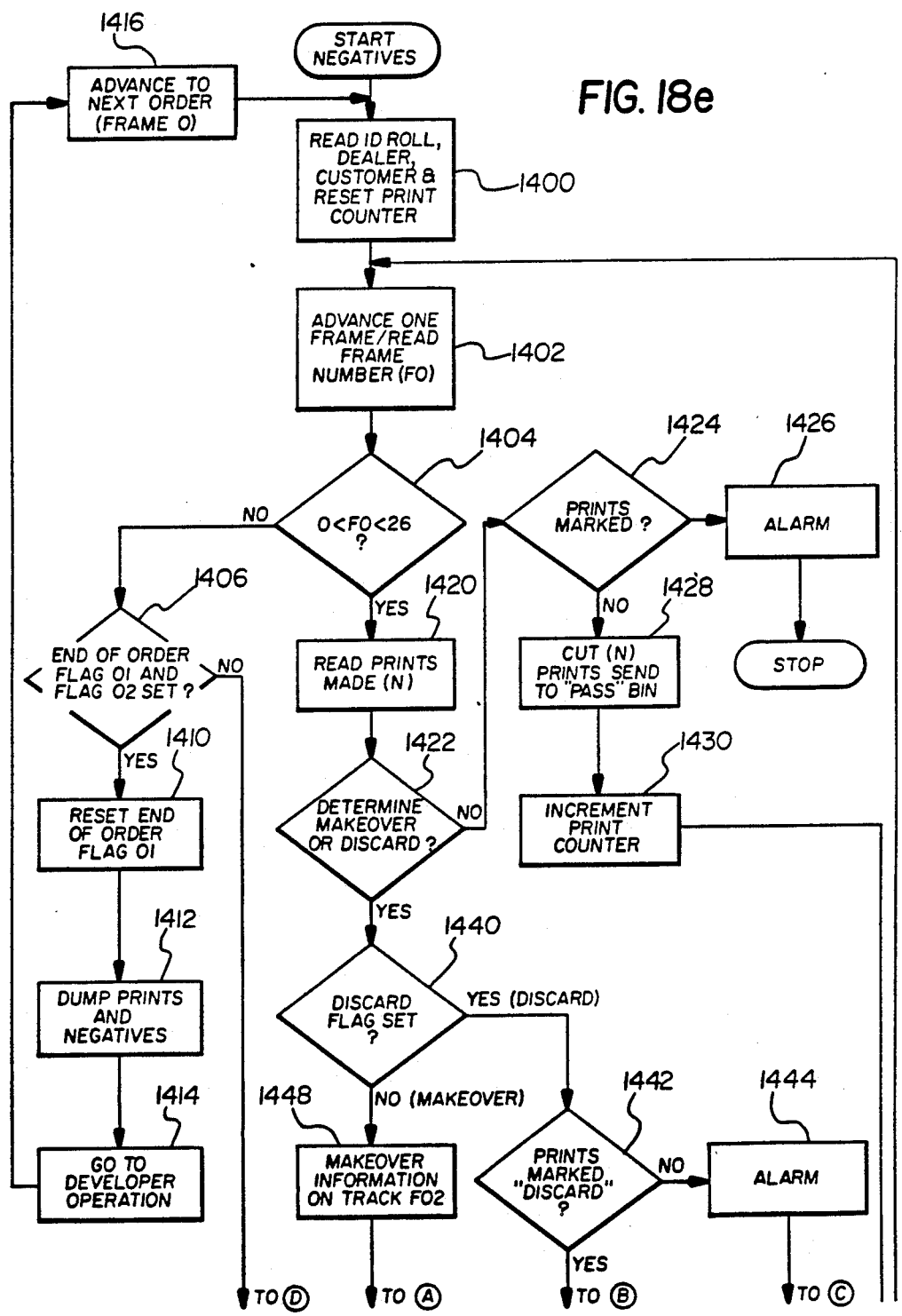
FIG. 18e is a flow diagram illustrating the order assembly process.
Figure 18E:
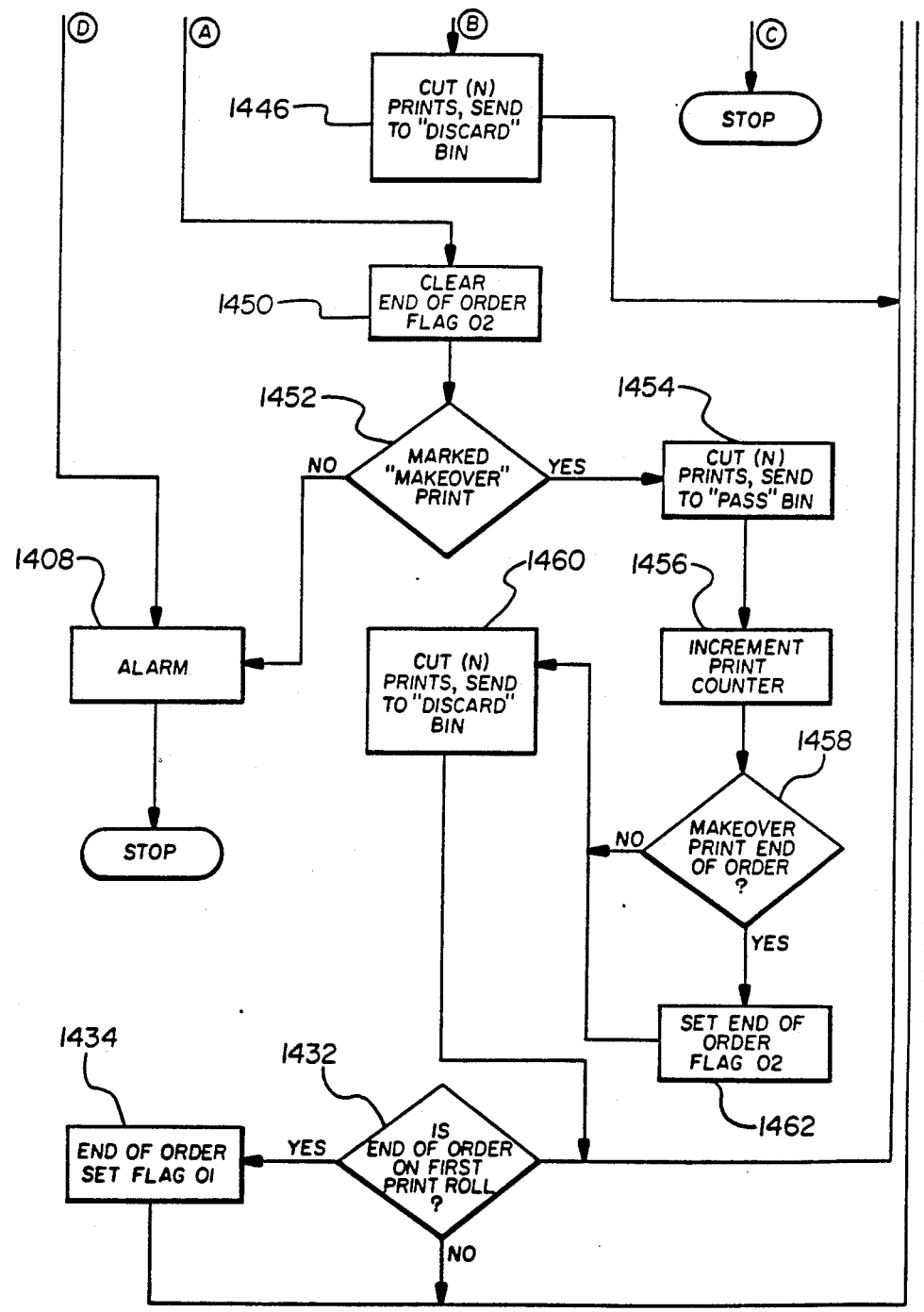

The sorter 985 of FIG. 10, under control of the controller 987 follows an assembly (or "sorter") algorithm stored in the memory 990. The sorter algorithm is illustrated in the flow diagram of FIG. 18e. Referring to FIG. 18e, the order assembly process begins as the sorter 985 receives the negatives 100. Starting with the first customer order, the sorter reads the data on track F00 of frame 0 specifying the dealer ID and the customer ID via the head 985a, while the controller 987 resets the print count (block 1400 of FIG. 18e). Next, the sorter 985 advances the negatives 100 by one frame and reads the frame number (block 1402). The controller 987 then determines whether the frame number falls within the range of the maximum number of frames within a given customer order (block 1404). If not (NO branch of block 1404), the controller 987 determines whether an end of order flag number 1 and end of order flag number 2 has been set (block 1406). As will be described below, end of order flag number 1 signifies that the current frame on the roll of first time prints 943 received at the sorter 985 includes an end of order notch or mark at its edge, while end of order flag number 2 signifies the same thing for the roll of makeover prints 983. Thus, if the controller 987 determines, at block 1404 of FIG. 18e, that the current frame number of the roll of negatives 100 at the sorter 985 exceeds the maximum frame number of a given customer's order (NO branch of block 1404) then both the end of order flag number 1 and end of order flag number 2 should have been set already, in order for the film to be in synchronization with the original print roll 943 and the makeover print roll 983. If this is not true (NO branch of block 1406) an alarm is set and the process is stopped (block 1408). Otherwise, the controller 987 resets end of order flag number 1 (block 1410) and causes the sorter 985 to dump the current batch of prints from print rolls 943 and 983 and negatives from the negative roll 100 to a bin (block 1412) for transmittal to the enveloper station 995 (block 1414), while the sorter 985 advances the roll of negatives 100 to frame 0 of the next customer order (block 1416) and the entire process begins again.

Returning to block 1404, if the current frame number is within the range of maximum number of frames of a given customer order (YES branch of block 1404) then the controller 987 causes the number of required prints for the current frame to be read from the customer order data on track F01 (block 1420) and then determines whether track F02 of that frame contains a makeover correction or data indicating a discard (block 1422). If not, the controller 987 prompts the operator to determine whether corresponding prints on the original print roll 943 are marked for makeover or discard (block 1424). If so, an alarm is sounded and the process is halted, since the prints and negatives are out of synchronization (block 1426). Otherwise, taking the NO branch of block 1424, everything is in synchronization, and the controller 987 causes the sorter 985 to cut from the print roll 943 a number of prints equal to the number of required prints (previously read) and to pass these prints to a bin for transmittal to the enveloper 995 (block 1428). Then, since the original roll of prints 943 has been advanced by the number of prints required, the print counter is incremented by the same number (block 1430). The controller 987 then determines whether an end of order notch or mark is present on the print now in position in the sorter (block 1432). If not, the process returns to block 1402. Otherwise (YES branch of block 1432) the controller 987 sets the end of order flag number 1 (block 1434) before returning to block 1402 in the process of FIG. 18e.

Returning to block 1422, if the controller 987 determines that makeover or discard data was recorded on track F02 of the frame (YES branch of block 1422), then the controller 987 determines whether the data on track F02 indicates that the discard flag was set (block 1440). If so, then the controller 987 prompts the operator to determine whether the corresponding print on the original roll 943 is marked for discard (block 1442). If not, the data on the roll of negatives 100 and the data on the roll of prints 943 do not match, an alarm is sounded and the process is stopped (block 1444). Otherwise, taking the YES branch of block 1442, the controller 987 causes the sorter 985 to cut the number of required prints (read previously at block 1420) from the roll of prints 943 for discarding (block 1446) and the process proceeds to block 1432 to repeat the steps previously described in connection therewith.

Returning to block 1440, if it is determined that no discard flag was set for the present frame, then, taking the NO branch of block 1440, the controller 987 concludes that the determination previously made at block 1422 indicates that a makeover correction is present in track F02 of the current frame, indicating that a corresponding makeover print on a makeover roll 983 is to be substituted in place of the corresponding prints on the original roll 943 (block 1448). The controller 987 therefore clears the end of order flag number 2 (block 1450). The controller 987 then prompts the operator to determine whether the current print on the original roll 943 is marked for makeover (block 1452). If not, the print roll and negative roll are not in synchronization (NO branch of block 1452) and the controller 987 sounds an alarm (block 1408). Otherwise, taking the YES branch of block 1452, the controller 987 causes the sorter 985 to cut the number of requested prints (previously read at block 1420) from the makeover roll 983, causing the makeover roll to be advanced to the end of the sorter 985 by the number of prints (block 1454) and increments the print counter (block 1456). The controller 987 then queries the sorter 985 as to whether the makeover print frame just received by the sorter 985 has an end of order notch (or mark) on it (block 1458). If not, the corresponding number of required prints (previously read at block 1420) is cut from the original print roll 943 for discarding and the process continues to block 1432. Otherwise, taking the YES branch of block 1458, the controller 987 sets the end of order flag number 2, signifying that the makeover print roll has reached an end of order notch. The original prints are then cut (block 1460).

Enveloper Algorithm

Figure 18F:
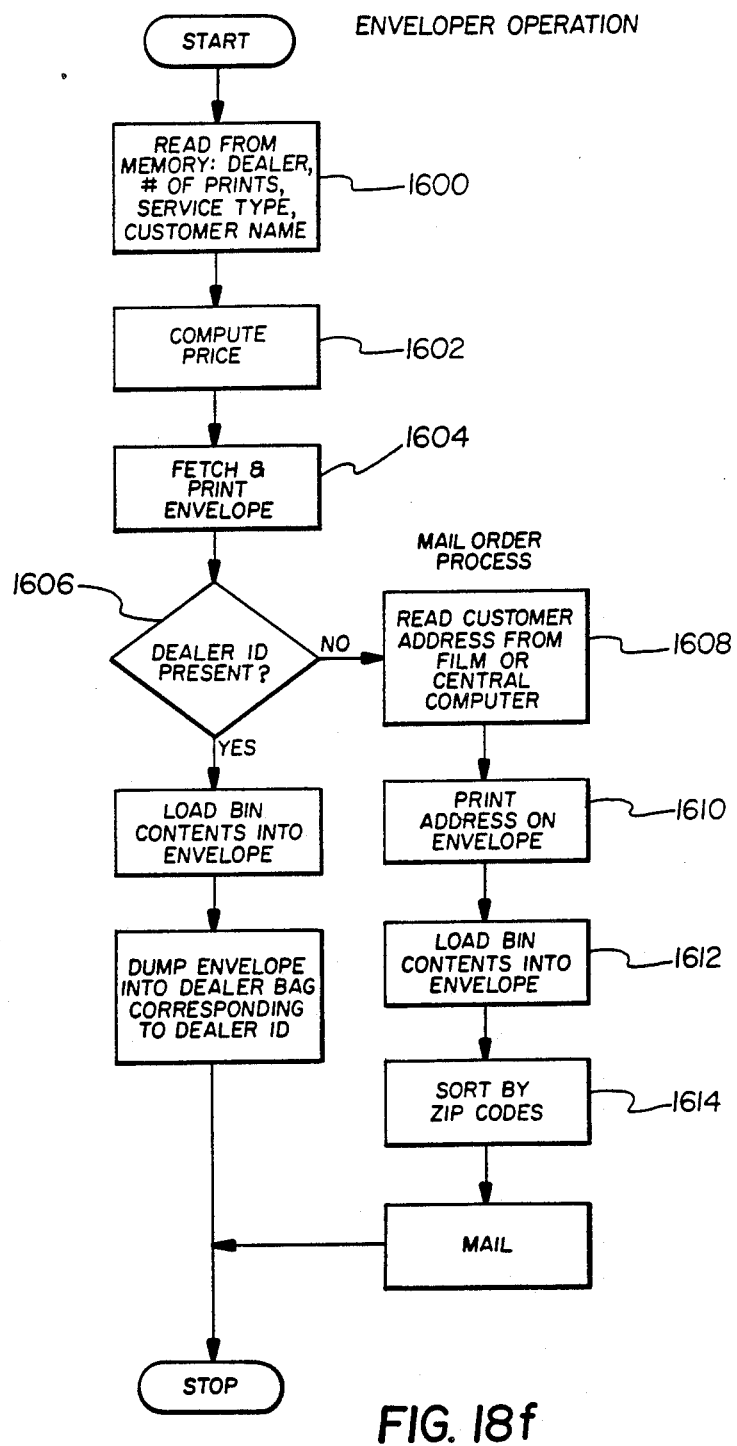
FIG. 18f is a flow diagram illustrating the enveloper process.

The controller 987, controlling an enveloper 985, executes an enveloper algorithm illustrated in FIG. 18f, this algorithm being stored in a memory 993. The process is as follows: The controller 987 uses data previously read from the negatives, namely the customer identification, the dealer identification, the number of prints and the type of service (block 1600). Using optional pricing information stored in the memory 983, the controller 987 computes the price of the customer's order (block 1602), fetches and prints an envelope addressed to the customer (block 1604) and then determines whether a dealer identification is present for that particular customer order (block 1606). If not, this indicates that the order was not received through a dealer but was instead mailed directly in by a customer. Therefore, a mail order process is employed (NO branch of block 1606). In this mail order process, the controller 987 reads the customer address from memory which was previously read from the negative 100 prior to its being cut by the sorter 985 (block 1608). The controller 987 then causes the enveloper 995 to print the customer's address on the envelope (block 1610) and load the bin contents in the envelope (block 1612), sort the envelope by zip code and place in the mail bin (block 1614).

Returning to block 1606, if a dealer identification had been written onto the negatives 100, then it is stored in memory, and this condition is sensed by the controller 987 (YES branch of block 1606). In response, the controller 987 loads the bin contents (film or prints) into the envelope, dumps the envelope into a dealer bag corresponding to the particular dealer ID.

While the invention has been described in detail by specific reference to preferred embodiments thereof, it is understood that other variations and modifications may be made without departing from the spirit and scope of the invention.

What is claimed is:

1. A method for developing and making prints from an elongate photographic film strip having successive frames, a virtually transparent magnetic layer and a plurality of longitudinal tracks magnetically recorded in said magnetic layer, each of said tracks being generally adjacent a corresponding one of said frames, different ones of said tracks containing magnetically recorded data relating to different data categories, said film strip having an initial frame wherein lies a makeover/reorder instruction track allocated to the recording of makeover and re-order instruction data, subsequent frames of said film strip bearing exposed images, each of said subsequent frames comprising one or more subsequent frame tracks dedicated to the recording of classification data and inspection data including makeover correction data for the respective subsequent frame, said method comprising:

if said instruction track in said initial frame is empty, determining the classification of each of said subsequent frames, recording said classification in a subsequent frame track of the respective subsequent frame and exposing and printing said frame in accordance with said classification;

if said instruction track in said initial frame is not empty, and if the data therein indicates makeover corrections for subsequent frames without re-order instruction data, determining from data in a subsequent frame track of those of said subsequent frames for which makeover corrections are required, the classification and makeover correction thereof, and making a print in accordance therewith; and if said instruction track in said initial frame contains re-order instruction data, determining from data recorded in a subsequent frame track, the classification and makeover correction, if any of each exposed frame, and making a print in accordance therewith.

2. The method of claim 1 further comprising the steps of:

inspecting each print made from each exposed frame of said film strip and determining thereby whether said print is correctable or not correctable;

if said print is correctable, determining the makeover correction to the classification previously recorded in a subsequent frame track of the corresponding one of said frames on said film strip and recording said makeover correction in a subsequent frame track of said corresponding frame; and if said print is not correctable, designating said print for discarding.

3. The method of claim 2 wherein one of said subsequent frame tracks is further dedicated to the recording of the frame number of each subsequent frame, and wherein each print generated from images on said film strip are comprised in a roll of prints, said method further comprising marking the last print made in accordance with customer order instructions recorded in said initial frame with an end of order mark, and determining from said frame number whether the current frame is the last frame on said strip, corresponding to an individual customer order, and, if so, then determining whether the corresponding print bears an end of order mark, and if said corresponding print does not bear such a mark, raising a flag indicating that said film strip and said prints are out of synchronization.

* * * * *

UNITED STATES PATENT AND TRADEMARK OFFICE
CERTIFICATE OF CORRECTION

PATENT NO. : 4,965,626
DATED : October 23, 1990
INVENTOR(S) : Gary L. Robison and Michael L. Wash It is certified that error appears in the above-identified patent and that said Letters Patent is hereby corrected as shown below:

```
Col. 9, line 58    "FOO" should read --F01--
Col. 11, line 66   delete "for" (second occurrence )
Col. 13, line 51   "of" should read --or--
Col. 15, line 29   "sorter'magnetic" should read --sorter's
                                                  magnetic--
Col. 17, line 30   "1" should read --0--
Col. 18, line 54   "FOO" should read --0--
Col. 19, line 38   "frist" should read --first--
Col. 20, line 16   "1078" should read --1078b--
```

Signed and Sealed this

Second Day of June, 1992

Attest:

DOUGLAS B. COMER

Attesting Officer

Acting Commissioner of Patents and Trademarks